US010383187B2

(12) United States Patent
Liao et al.

(10) Patent No.: US 10,383,187 B2
(45) Date of Patent: *Aug. 13, 2019

(54) SYSTEMS AND METHODS FOR INTELLIGENT CONTROL RELATED TO TRIAC DIMMERS

(71) Applicant: GUANGZHOU ON-BRIGHT ELECTRONICS CO., LTD., Guangzhou (CN)

(72) Inventors: Yimu Liao, Guangzhou (CN); Yuhao Liang, Guangzhou (CN); Zhiliang Chen, Shanghai (CN); Lieyi Fang, Shanghai (CN)

(73) Assignee: Guangzhou On-Bright Electronics Co., Ltd., Guangzhou (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/263,080

(22) Filed: Sep. 12, 2016

(65) Prior Publication Data

US 2017/0064787 A1 Mar. 2, 2017

Related U.S. Application Data

(63) Continuation of application No. 14/593,734, filed on Jan. 9, 2015, now Pat. No. 9,480,118.

(30) Foreign Application Priority Data

Apr. 25, 2014 (CN) .......................... 2014 1 0172086

(51) Int. Cl.
*H05B 33/08* (2006.01)

(52) U.S. Cl.
CPC ..... *H05B 33/0845* (2013.01); *H05B 33/0815* (2013.01); *Y02B 20/347* (2013.01)

(58) Field of Classification Search
CPC ............ H05B 33/0815; H05B 33/0818; H05B 33/0809; H05B 37/029; H05B 37/02;
(Continued)

(56) References Cited

U.S. PATENT DOCUMENTS 3,803,452 A 4/1974 Goldschmied
3,899,713 A 8/1975 Barkan et al.
(Continued)

FOREIGN PATENT DOCUMENTS

CN 1448005 A 10/2003
CN 101657057 A 2/2010
(Continued)

OTHER PUBLICATIONS

China Patent Office, Office Action dated Aug. 28, 2015, in Application No. 201410322602.9.

(Continued)

*Primary Examiner* — Douglas W Owens
*Assistant Examiner* — Syed M Kaiser
(74) *Attorney, Agent, or Firm* — Faegre Baker Daniels LLP

(57) ABSTRACT

System controller and method for a lighting system. The system controller includes a first controller terminal configured to receive a first signal, and a second controller terminal configured to output a second signal to a diver component. The driver component is configured to receive a first current and provide one or more drive currents to one or more light emitting diodes in response to the second signal. Additionally, the system controller is configured to process information associated with the first signal, determine a first time period for the first signal to increase from a first threshold to a second threshold, and determine a second time period for the first signal to decrease from the second threshold to the first threshold.

4 Claims, 9 Drawing Sheets

(58) Field of Classification Search
CPC .............. H05B 41/3925; H05B 41/391; H05B 41/2828; H05B 33/0803
USPC ..................... 315/224, 119, 200 R, 291, 307
See application file for complete search history.

(56) References Cited

U.S. PATENT DOCUMENTS

| | | | |
|---|---|---|---|
| 4,253,045 A | 2/1981 | Weber | |
| 5,144,205 A | 9/1992 | Motto et al. | |
| 5,249,298 A | 9/1993 | Bolan et al. | |
| 5,504,398 A | 4/1996 | Rothenbuhler | |
| 5,949,197 A | 9/1999 | Kastner | |
| 6,218,788 B1 | 4/2001 | Chen et al. | |
| 6,229,271 B1 | 5/2001 | Liu | |
| 6,278,245 B1 | 8/2001 | Li et al. | |
| 7,038,399 B2 | 5/2006 | Lys et al. | |
| 7,649,327 B2 | 1/2010 | Peng | |
| 7,825,715 B1 | 11/2010 | Greenberg | |
| 7,880,400 B2 | 2/2011 | Zhou et al. | |
| 7,944,153 B2 | 5/2011 | Greenfeld | |
| 8,134,302 B2 | 3/2012 | Yang et al. | |
| 8,278,832 B2 | 10/2012 | Hung et al. | |
| 8,378,583 B2 | 2/2013 | Hying et al. | |
| 8,378,588 B2 | 2/2013 | Kuo et al. | |
| 8,378,589 B2 | 2/2013 | Kuo et al. | |
| 8,415,901 B2 | 4/2013 | Recker et al. | |
| 8,432,438 B2 | 4/2013 | Ryan et al. | |
| 8,497,637 B2 | 7/2013 | Liu | |
| 8,569,956 B2 | 10/2013 | Shteynberg et al. | |
| 8,644,041 B2 | 2/2014 | Pansier | |
| 8,698,419 B2 | 4/2014 | Yan et al. | |
| 8,716,882 B2 | 5/2014 | Pettler et al. | |
| 8,890,440 B2 | 11/2014 | Yan et al. | |
| 8,941,324 B2 | 1/2015 | Zhou et al. | |
| 9,030,122 B2 | 5/2015 | Yan et al. | |
| 9,084,316 B2 | 7/2015 | Melanson et al. | |
| 9,148,050 B2 | 9/2015 | Chiang | |
| 9,220,133 B2 | 12/2015 | Salvestrini et al. | |
| 9,220,136 B2 | 12/2015 | Zhang | |
| 9,247,623 B2 | 1/2016 | Recker et al. | |
| 9,247,625 B2 | 1/2016 | Recker et al. | |
| 9,301,349 B2 | 3/2016 | Zhu et al. | |
| 9,332,609 B1 | 5/2016 | Rhodes et al. | |
| 9,402,293 B2 | 7/2016 | Vaughan et al. | |
| 9,408,269 B2 | 8/2016 | Zhu et al. | |
| 9,414,455 B2 | 8/2016 | Zhou et al. | |
| 9,467,137 B2 | 10/2016 | Eum et al. | |
| 9,480,118 B2 | 10/2016 | Liao et al. | |
| 9,554,432 B2 | 1/2017 | Zhu et al. | |
| 9,585,222 B2 | 2/2017 | Zhu et al. | |
| 9,655,188 B1 | 5/2017 | Lewis et al. | |
| 9,723,676 B2 | 8/2017 | Ganick et al. | |
| 9,750,107 B2 | 8/2017 | Zhu et al. | |
| 9,820,344 B1 | 11/2017 | Papanicolaou | |
| 9,883,561 B1 | 1/2018 | Liang et al. | |
| 9,883,562 B2 | 1/2018 | Zhu et al. | |
| 9,961,734 B2 | 6/2018 | Zhu et al. | |
| 10,054,271 B2 | 8/2018 | Xiong et al. | |
| 2006/0022648 A1 | 2/2006 | Ben-Yaakov et al. | |
| 2007/0182338 A1 | 8/2007 | Shteynberg et al. | |
| 2007/0182699 A1 | 8/2007 | Ha et al. | |
| 2007/0267978 A1 | 11/2007 | Shteynberg et al. | |
| 2008/0224629 A1 | 9/2008 | Melanson | |
| 2008/0278092 A1 | 11/2008 | Lys et al. | |
| 2009/0021469 A1 | 1/2009 | Yeo et al. | |
| 2009/0251059 A1 | 10/2009 | Veltman | |
| 2010/0141153 A1 | 6/2010 | Recker et al. | |
| 2010/0156319 A1 | 6/2010 | Melanson | |
| 2010/0164406 A1 | 7/2010 | Kost et al. | |
| 2010/0176733 A1 | 7/2010 | King | |
| 2010/0207536 A1 | 8/2010 | Burdalski | |
| 2010/0213859 A1 | 8/2010 | Shteynberg | |
| 2010/0231136 A1 | 9/2010 | Reisenauer et al. | |
| 2011/0037399 A1 | 2/2011 | Hung et al. | |
| 2011/0080110 A1 | 4/2011 | Nuhfer et al. | |
| 2011/0080111 A1 | 4/2011 | Nuhfer et al. | |
| 2011/0101867 A1 | 5/2011 | Wang et al. | |
| 2011/0121744 A1 | 5/2011 | Salvestrini | |
| 2011/0121754 A1 | 5/2011 | Shteynberg | |
| 2011/0133662 A1 | 6/2011 | Yan et al. | |
| 2011/0227490 A1 | 9/2011 | Huynh | |
| 2011/0260619 A1 | 10/2011 | Sadwick | |
| 2011/0285301 A1 | 11/2011 | Kuang et al. | |
| 2011/0291583 A1 | 12/2011 | Shen | |
| 2011/0309759 A1 | 12/2011 | Shteynberg | |
| 2012/0001548 A1 | 1/2012 | Recker et al. | |
| 2012/0032604 A1 | 2/2012 | Hontele | |
| 2012/0069616 A1 | 3/2012 | Kitamura et al. | |
| 2012/0080944 A1 | 4/2012 | Recker et al. | |
| 2012/0081009 A1 | 4/2012 | Shteynberg et al. | |
| 2012/0146526 A1* | 6/2012 | Lam ................ | H05B 41/2824 315/200 R |
| 2012/0181944 A1 | 7/2012 | Jacobs et al. | |
| 2012/0181946 A1 | 7/2012 | Melanson | |
| 2012/0187857 A1 | 7/2012 | Ulmann et al. | |
| 2012/0242237 A1 | 9/2012 | Chen et al. | |
| 2012/0262093 A1 | 10/2012 | Recker et al. | |
| 2012/0268031 A1 | 10/2012 | Zhou et al. | |
| 2012/0299500 A1 | 11/2012 | Sadwick | |
| 2012/0299501 A1 | 11/2012 | Kost et al. | |
| 2012/0319604 A1 | 12/2012 | Walters | |
| 2012/0326616 A1* | 12/2012 | Sumitani ............ | H05B 33/0815 315/201 |
| 2013/0009561 A1 | 1/2013 | Briggs | |
| 2013/0020965 A1 | 1/2013 | Kang et al. | |
| 2013/0026942 A1 | 1/2013 | Ryan et al. | |
| 2013/0026945 A1 | 1/2013 | Ganick et al. | |
| 2013/0027528 A1 | 1/2013 | Staats et al. | |
| 2013/0034172 A1 | 2/2013 | Pettier et al. | |
| 2013/0043726 A1 | 2/2013 | Krishnamoorthy et al. | |
| 2013/0063047 A1 | 3/2013 | Veskovic | |
| 2013/0154487 A1 | 6/2013 | Kuang et al. | |
| 2013/0162158 A1 | 6/2013 | Pollischanshy | |
| 2013/0175931 A1 | 7/2013 | Sadwick | |
| 2013/0181630 A1 | 7/2013 | Taipale et al. | |
| 2013/0193879 A1 | 8/2013 | Sadwick | |
| 2013/0194848 A1 | 8/2013 | Bernardinis et al. | |
| 2013/0215655 A1* | 8/2013 | Yang ................ | H05B 33/0851 363/89 |
| 2013/0223107 A1 | 8/2013 | Zhang et al. | |
| 2013/0241427 A1 | 9/2013 | Kesterson et al. | |
| 2013/0241428 A1 | 9/2013 | Takeda | |
| 2013/0241441 A1 | 9/2013 | Myers et al. | |
| 2013/0242622 A1 | 9/2013 | Peng | |
| 2013/0307431 A1 | 11/2013 | Zhu et al. | |
| 2013/0307434 A1 | 11/2013 | Zhang | |
| 2014/0009082 A1 | 1/2014 | King et al. | |
| 2014/0029315 A1 | 1/2014 | Zhang et al. | |
| 2014/0063857 A1 | 3/2014 | Peng | |
| 2014/0078790 A1 | 3/2014 | Lin et al. | |
| 2014/0103829 A1 | 4/2014 | Kang | |
| 2014/0132172 A1 | 5/2014 | Zhu et al. | |
| 2014/0160809 A1 | 6/2014 | Lin et al. | |
| 2014/0176016 A1 | 6/2014 | Li et al. | |
| 2014/0197760 A1 | 7/2014 | Radermacher | |
| 2014/0265898 A1 | 9/2014 | Del Carmen, Jr. et al. | |
| 2014/0265935 A1 | 9/2014 | Sadwick | |
| 2014/0268935 A1 | 9/2014 | Chiang | |
| 2014/0346973 A1 | 11/2014 | Zhu et al. | |
| 2014/0354170 A1 | 12/2014 | Gredler | |
| 2015/0035450 A1 | 2/2015 | Werner | |
| 2015/0077009 A1* | 3/2015 | Kunimatsu ........ | H05B 33/0815 315/224 |
| 2015/0091470 A1 | 4/2015 | Zhou et al. | |
| 2015/0312982 A1 | 10/2015 | Melanson | |
| 2015/0312988 A1 | 10/2015 | Liao et al. | |
| 2015/0333764 A1 | 11/2015 | Pastore et al. | |
| 2015/0357910 A1 | 12/2015 | Murakami et al. | |
| 2015/0359054 A1 | 12/2015 | Lin et al. | |
| 2015/0366010 A1 | 12/2015 | Mao et al. | |
| 2016/0014861 A1 | 1/2016 | Zhu et al. | |
| 2016/0014865 A1 | 1/2016 | Zhu et al. | |
| 2016/0037604 A1 | 2/2016 | Zhu et al. | |
| 2016/0119998 A1 | 4/2016 | Linnartz et al. | |

(56) References Cited

U.S. PATENT DOCUMENTS

| | | | |
|---|---|---|---|
| 2016/0286617 A1 | 9/2016 | Takahashi et al. |
| 2016/0338163 A1 | 11/2016 | Zhu et al. |
| 2017/0027029 A1 | 1/2017 | Hu et al. |
| 2017/0181235 A1 | 6/2017 | Zhu et al. |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0103520 A1 | 4/2018 | Zhu et al. |
| 2018/0110104 A1 | 4/2018 | Liang et al. |
| 2018/0288845 A1 | 10/2018 | Zhu et al. |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014540 | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103260302 A | 8/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| CN | 203675408 U | 6/2014 |
| CN | 103945614 A | 7/2014 |
| CN | 103096606 B | 12/2014 |
| CN | 103781229 B | 9/2015 |
| CN | 105265019 | 1/2016 |
| CN | 105423140 A | 3/2016 |
| CN | 105591553 A | 5/2016 |
| CN | 105873269 | 8/2016 |
| CN | 205812458 U | 12/2016 |
| CN | 106358337 A | 1/2017 |
| CN | 106793246 A | 5/2017 |
| CN | 107046751 A | 8/2017 |
| CN | 106332374 A | 11/2017 |
| EP | 2403318 A1 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 | 2/2012 |
| TW | 201233021 A | 8/2012 |
| TW | I 387396 | 2/2013 |
| TW | 201315118 A | 4/2013 |
| TW | 201322825 A | 6/2013 |
| TW | 201342987 | 10/2013 |
| TW | I-422130 | 1/2014 |
| TW | I 423732 | 1/2014 |
| TW | 201412189 A | 3/2014 |
| TW | 201414146 A | 4/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I 448198 | 8/2014 |
| TW | 201503756 A | 1/2015 |
| TW | I 496502 B | 8/2015 |
| TW | 201630468 A | 8/2016 |
| TW | 201639415 A | 11/2016 |

OTHER PUBLICATIONS

China Patent Office, Office Action dated Aug. 8, 2015, in Application No. 201410172086.6.

China Patent Office, Office Action dated Mar. 2, 2016, in Application No. 201410172086.6.

China Patent Office, Office Action dated Dec. 14, 2015, in Application No. 201210166672.0.

China Patent Office, Office Action dated Sep. 2, 2016, in Application No. 201510103579.9.

China Patent Office, Office Action dated Jul. 7, 2014, in Application No. 201210468505.1.

China Patent Office, Office Action dated Jun. 3, 2014, in Application No. 201110103130.4.

China Patent Office, Office Action dated Jun. 30, 2015, in Application No. 201410171893.6.

China Patent Office, Office Action dated Nov. 15, 2014, in Application No. 201210166672.0.

China Patent Office, Office Action dated Oct. 19, 2015, in Application No. 201410322612.2.

China Patent Office, Office Action dated Mar. 3, 2016, in Application No. 201410322612.2.

Taiwan Intellectual Property Office, Office Action dated Jan. 7, 2014, in Application No. 100119272.

Taiwan Intellectual Property Office, Office Action dated Jun. 9, 2014, in Application No. 101124982.

Taiwan Intellectual Property Office, Office Action dated Nov. 13, 2015, in Application No. 103141628.

Taiwan Intellectual Property Office, Office Action dated Sep. 17, 2015, in Application No. 103127108.

Taiwan Intellectual Property Office, Office Action dated Sep. 17, 2015, in Application No. 103127620.

Taiwan Intellectual Property Office, Office Action dated Sep. 25, 2014, in Application No. 101148716.

Taiwan Intellectual Property Office, Office Action dated Apr. 18, 2016, in Application No. 103140989.

United States Patent and Trademark Office, Notice of Allowance dated Apr. 9, 2015, in U.S. Appl. No. 13/527,475.

United States Patent and Trademark Office, Notice of Allowance dated May 7, 2015, in U.S. Appl. No. 13/527,475.

United States Patent and Trademark Office, Notice of Allowance dated Oct. 22, 2015, in U.S. Appl. No. 13/527,475.

United States Patent and Trademark Office, Office Action dated Dec. 2, 2014, in U.S. Appl. No. 13/527,475.

United States Patent and Trademark Office, Notice of Allowance dated Mar. 7, 2016, in U.S. Appl. No. 13/710,277.

United States Patent and Trademark Office, Notice of Allowance dated Dec. 21, 2015, in U.S. Appl. No. 13/710,277.

United States Patent and Trademark Office, Office Action dated Jun. 5, 2015, in U.S. Appl. No. 13/710,277.

United States Patent and Trademark Office, Office Action dated Jan. 13, 2016, in U.S. Appl. No. 14/451,656.

United States Patent and Trademark Office, Office Action dated Dec. 17, 2015, in U.S. Appl. No. 14/459,167.

United States Patent and Trademark Office, Office Action dated Sep. 6, 2016, in U.S. Appl. No. 14/459,167.

United States Patent and Trademark Office, Notice of Allowance dated Mar. 30, 2016, in U.S. Appl. No. 14/562,432.

(56) References Cited

OTHER PUBLICATIONS

United States Patent and Trademark Office, Notice of Allowance dated Jan. 21, 2016, in U.S. Appl. No. 14/562,432.
United States Patent and Trademark Office, Notice of Allowance dated Sep. 12, 2016, in U.S. Appl. No. 14/819,200.
United States Patent and Trademark Office, Office Action dated Aug. 19, 2015, in U.S. Appl. No. 14/562,432.
United States Patent and Trademark Office, Office Action dated Jan. 15, 2015, in U.S. Appl. No. 14/562,432.
United States Patent and Trademark Office, Office Action dated Dec. 30, 2015, in U.S. Appl. No. 14/593,734.
United States Patent and Trademark Office, Notice of Allowance dated Jun. 16, 2015, in U.S. Appl. No. 14/593,734.
United States Patent and Trademark Office, Office Action dated Dec. 3, 2015, in U.S. Appl. No. 14/819,200.
United States Patent and Trademark Office, Notice of Allowance dated Jun. 16, 2016, in U.S. Appl. No. 14/593,734.
United States Patent and Trademark Office, Notice of Allowance dated Oct. 20, 2016, in U.S. Appl. No. 14/451,656.
United States Patent and Trademark Office, Office Action dated Jun. 27, 2017, in U.S. Appl. No. 14/459,167.
United States Patent and Trademark Office, Notice of Allowance dated Apr. 21, 2017, in U.S. Appl. No. 15/364,100.
United States Patent and Trademark Office, Notice of Allowance dated Jul. 27, 2017, in U.S. Appl. No. 15/364,100.
United States Patent and Trademark Office, Notice of Allowance dated Apr. 21, 2017, in U.S. Appl. No. 14/532,811.
United States Patent and Trademark Office, Office Action dated Jun. 1, 2017, in U.S. Appl. No. 15/372,324.
United States Patent and Trademark Office, Notice of Allowance dated Jul. 13, 2017, in U.S. Appl. No. 15/403,520.
Taiwan Intellectual Property Office, Office Action dated Aug. 23, 2017, in Application No. 106103535.
United States Patent and Trademark Office, Office Action dated Aug. 29, 2017, in U.S. Appl. No. 15/158,237.
United States Patent and Trademark Office, Notice of Allowance dated Nov. 1, 2017, in U.S. Appl. No. 15/364,100.
United States Patent and Trademark Office, Notice of Allowance dated Oct. 10, 2017, in U.S. Appl. No. 15/403,520.
United States Patent and Trademark Office, Office Action dated Oct. 3, 2017, in U.S. Appl. No. 15/649,586.
United States Patent and Trademark Office, Office Action dated Oct. 3, 2017, in U.S. Appl. No. 15/649,566.
United States Patent and Trademark Office, Notice of Allowance dated Dec. 26, 2017, in U.S. Appl. No. 14/459,167.
United States Patent and Trademark Office, Office Action dated Dec. 13, 2017, in U.S. Appl. No. 15/372,324.
United States Patent and Trademark Office, Notice of Allowance dated Mar. 23, 2018, in U.S. Appl. No. 15/158,237.
United States Patent and Trademark Office, Office Action dated Feb. 16, 2018, in U.S. Appl. No. 15/836,478.
United States Patent and Trademark Office, Office Action dated Mar. 6, 2018, in U.S. Appl. No. 15/836,461.
United States Patent and Trademark Office, Office Action dated Jul. 30, 2018, in U.S. Appl. No. 15/836,478.
United States Patent and Trademark Office, Office Action dated Aug. 3, 2018, in U.S. Appl. No. 15/372,324.
United States Patent and Trademark Office, Notice of Allowance dated May 23, 2018, in U.S. Appl. No. 15/649,586.
United States Patent and Trademark Office, Office Action dated May 11, 2018, in U.S. Appl. No. 15/649,566.
Taiwan Intellectual Property Office, Office Action dated Feb. 27, 2018, in Application No. 106136242.
Taiwan Intellectual Property Office, Office Action dated Feb. 6, 2018, in Application No. 106130686.
United States Patent and Trademark Office, Notice of Allowance dated Oct. 19, 2018, in U.S. Appl. No. 15/158,237.
United States Patent and Trademark Office, Notice of Allowance dated Sep. 24, 2018, in U.S. Appl. No. 15/849,452.
United States Patent and Trademark Office, Notice of Allowance dated Oct. 24, 2018, in U.S. Appl. No. 15/649,586.
United States Patent and Trademark Office, Office Action dated Nov. 2, 2018, in U.S. Appl. No. 15/836,461.
United States Patent and Trademark Office, Office Action dated Oct. 3, 2018, in U.S. Appl. No. 15/934,460.
United States Patent and Trademark Office, Notice of Allowance dated Sep. 24, 2018, in U.S. Appl. No. 15/836,478.
China Patent Office, Office Action dated Nov. 29, 2018, in Application No. 201710828263.5.
China Patent Office, Office Action dated Dec. 3, 2018, in Application No. 201710557179.4.
Taiwan Intellectual Property Office, Office Action dated Jan. 14, 2019, in Application No. 107107508.
United States Patent and Trademark Office, Notice of Allowance dated Jan. 25, 2019, in U.S. Appl. No. 15/849,452.
United States Patent and Trademark Office, Notice of Allowance dated Jan. 7, 2019, in U.S. Appl. No. 15/372,324.
United States Patent and Trademark Office, Notice of Allowance dated Dec. 27, 2018, in U.S. Appl. No. 15/649,566.
United States Patent and Trademark Office, Office Action dated Jan. 11, 2019, in U.S. Appl. No. 16/009,727.
United States Patent and Trademark Office, Notice of Allowance dated Dec. 3, 2018, in U.S. Appl. No. 15/836,478.
China Patent Office, Office Action dated Mar. 22, 2019, in Application No. 201711464007.9.
United States Patent and Trademark Office, Notice of Allowance dated Apr. 4, 2019, in U.S. Appl. No. 15/836,461.
United States Patent and Trademark Office, Office Action dated Apr. 17, 2019, in U.S. Appl. No. 16/119,952.

* cited by examiner

SYSTEMS AND METHODS FOR INTELLIGENT CONTROL RELATED TO TRIAC DIMMERS

1. CROSS-REFERENCES TO RELATED APPLICATIONS

This application is a continuation of U.S. patent application Ser. No. 14/593,734, filed Jan. 9, 2015, which claims priority to Chinese Patent Application No. 201410172086.6, filed Apr. 25, 2014, both of the above-referenced applications being commonly assigned and incorporated by reference herein for all purposes.

Additionally, this application is related to U.S. patent application Ser. No. 14/451,656, which is incorporated by reference herein for all purposes.

2. BACKGROUND OF THE INVENTION

Certain embodiments of the present invention are directed to integrated circuits. More particularly, some embodiments of the invention provide a system and method for intelligent control related to TRIAC dimmers. Merely by way of example, some embodiments of the invention have been applied to driving light emitting diodes (LEDs). But it would be recognized that the invention has a much broader range of applicability.

A conventional lighting system may include or may not include a TRIAC dimmer that is a dimmer including a Triode for Alternating Current (TRIAC). For example, the TRIAC dimmer is either a leading-edge TRIAC dimmer or a trailing-edge TRIAC dimmer. Often, the leading-edge TRIAC dimmer and the trailing-edge TRIAC dimmer are configured to receive an alternating-current (AC) input voltage, process the AC input voltage by clipping part of the waveform of the AC input voltage, and generate an voltage that is then received by a rectifier (e.g., a full wave rectifying bridge) in order to generate a rectified output voltage.

FIG. 1 shows certain conventional timing diagrams for a leading-edge TRIAC dimmer and a trailing-edge TRIAC dimmer. The waveforms 110, 120, and 130 are merely examples. Each of the waveforms 110, 120, and 130 represents a rectified output voltage as a function of time that is generated by a rectifier. For the waveform 110, the rectifier receives an AC input voltage without any processing by a TRIAC dimmer. For the waveform 120, an AC input voltage is received by a leading-edge TRIAC dimmer, and the voltage generated by the leading-edge TRIAC dimmer is received by the rectifier, which then generates the rectified output voltage. For the waveform 130, an AC input voltage is received by a trailing-edge TRIAC dimmer, and the voltage generated by the trailing-edge TRIAC dimmer is received by the rectifier, which then generates the rectified output voltage.

As shown by the waveform 110, each cycle of the rectified output voltage has, for example, a phase angel (e.g., $\phi$) that changes from 0° to 180° and then from 180° to 360°. As shown by the waveform 120, the leading-edge TRIAC dimmer usually processes the AC input voltage by clipping part of the waveform that corresponds to the phase angel starting at 0° or starting at 180°. As shown by the waveform 130, the trailing-edge TRIAC dimmer often processes the AC input voltage by clipping part of the waveform that corresponds to the phase angel ending at 180° or ending at 360°.

Various conventional technologies have been used to detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. In one conventional technology, a rectified output voltage generated by a rectifier is compared with a threshold voltage $V_{th\_on}$ in order to determine a turn-on time period $T_{on}$. If the turn-on time period $T_{on}$ is equal to the duration of a half cycle of the AC input voltage, no TRIAC dimmer is determined to be included in the lighting system; if the turn-on time period $T_{on}$ is smaller than the duration of a half cycle of the AC input voltage, a TRIAC dimmer is determined to be included in the lighting system. If a TRIAC dimmer is determined to be included in the lighting system, a turn-on voltage $V_{on}$ is compared with the threshold voltage $V_{th\_on}$. If the turn-on voltage $V_{on}$ is larger than the threshold voltage $V_{th\_on}$, the TRIAC dimmer is determined to be a leading-edge TRIAC dimmer; if the turn-on voltage $V_{on}$ is smaller than the threshold voltage $V_{th\_on}$, the TRIAC dimmer is determined to be a trailing-edge TRIAC dimmer.

In another conventional technology, a rate of change of a rectified output voltage is used. The rectified output voltage is generated by a rectifier, and its rate of change is determined by quickly sampling the rectified voltage twice. Depending on the phase angles at which these two sampling actions are taken, a predetermined range for the rate of change is used. If the rate of change falls within this predetermined range, no TRIAC dimmer is determined to be included in the lighting system; if the rate of change falls outside this predetermined range, a TRIAC dimmer is determined to be included in the lighting system. If a TRIAC dimmer is determined to be included in the lighting system, whether the rate of change is positive or negative is used to determine the type of the TRIAC dimmer. If the rate of change is positive, the TRIAC dimmer is determined to be a leading-edge TRIAC dimmer; if the rate of change is negative, the TRIAC dimmer is determined to be a trailing-edge TRIAC dimmer.

If a conventional lighting system includes a TRIAC dimmer and light emitting diodes (LEDs), the light emitting diodes may flicker if the current that flows through the TRIAC dimmer falls below a holding current that is, for example, required by the TRIAC dimmer. As an example, if the current that flows through the TRIAC dimmer falls below the holding current, the TRIAC dimmer may turn on and off repeatedly, thus causing the LEDs to flicker. As another example, the various TRIAC dimmers made by different manufacturers have different holding currents ranging from 5 mA to 50 mA.

In order to solve this flickering problem, certain conventional technology uses a bleeder for the conventional lighting system. FIG. 2 is a simplified diagram of a conventional lighting system that includes a bleeder. As shown, the lighting system 200 includes a TRIAC dimmer 210, a rectifier 220, a bleeder 230, an LED driver 240, and LEDs 250. The TRIAC dimmer 210 receives an AC input voltage 214 (e.g., $V_{line}$) and generate a voltage 212. The voltage 212 is received by the rectifier 220 (e.g., a full wave rectifying bridge), which then generates a rectified output voltage 222 and a rectified output current 260. The rectified output current 260 is equal to the current that flows through the TRIAC dimmer 210, and is also equal to the sum of currents 232 and 242. The current 232 is received by the bleeder 230, and the current 242 is received by the LED driver 240. The magnitude of the current 232 may have a fixed magnitude or may change between two different predetermined magnitudes.

FIG. 3 is a simplified diagram showing certain conventional components of the bleeder as part of the lighting system 200 as shown in FIG. 2. The bleeder 230 includes a current detection circuit 310, a logic control circuit 320, and current sinks 330 and 340. As shown in FIG. 3, a current 350 is configured to follow through a resistor 360 in order to generate a voltage 370 (e.g., $V_1$). The current 350 equals the rectified output current 260 in magnitude, and the voltage 370 represents the magnitude of the current 350. The voltage 370 is divided by resistors 362 and 364 to generate a voltage 372 (e.g., $V_2$). The voltage 372 is received by the current detection circuit 310, which sends detected information to the logic control circuit 320. In response, the logic control circuit 320 either enables the current sink 330 with a control signal 332 or enables the current sink 340 with a control signal 342. The control signals 332 and 342 are generated by the logic control circuit 320 and are complementary to each other. If the current sink 330 is enabled, the current 232 received by the bleeder 230 is equal to a current 334; if the current sink 340 is enabled, the current 232 is equal to a current 344. The current 344 is larger than the current 334 in magnitude.

Returning to FIG. 2, the voltage 212 generated by the TRIAC dimmer 210 may have waveforms that are not symmetric between a positive half cycle and a negative half cycle of the AC input voltage 214. This lack of symmetry can cause the current that flows through the LEDs 250 to vary with time; therefore, the LEDs 250 can flicker at a fixed frequency (e.g., 50 Hz or 60 Hz). Also, according to certain conventional technology, a single TRIAC dimmer (e.g., the TRIAC dimmer 210) and a single rectifier (e.g., the rectifier 220) are used to support multiple lamp subsystems that are connected in parallel. Each lamp subsystem includes a bleeder (e.g., the bleeder 230), an LED driver (e.g., the LED driver 240), and LEDs (e.g., LEDs 250), and is associated with a rectified output current (e.g., the rectified output current 260) that provides currents to the bleeder (e.g., the bleeder 230) and the LED driver (e.g., the LED driver 240). The sum of these rectified output currents of multiple lamp subsystems is equal to the current that flows through the TRIAC dimmer (e.g., the TRIAC dimmer 210). Often, each rectified output current for each lamp subsystem is made larger than the holding current of the TRIAC dimmer (e.g., the TRIAC dimmer 210); hence the sum of these rectified output currents become much larger than the holding current of the TRIAC dimmer (e.g., the TRIAC dimmer 210), wasting of energy and thus lowering efficiency of the system.

Hence it is highly desirable to improve the techniques of dimming control.

3. BRIEF SUMMARY OF THE INVENTION

Certain embodiments of the present invention are directed to integrated circuits. More particularly, some embodiments of the invention provide a system and method for intelligent control related to TRIAC dimmers. Merely by way of example, some embodiments of the invention have been applied to driving light emitting diodes (LEDs). But it would be recognized that the invention has a much broader range of applicability.

According to one embodiment, a system controller for a lighting system includes a first controller terminal configured to receive a first signal, and a second controller terminal configured to output a second signal to a diver component. The driver component is configured to receive a first current and provide one or more drive currents to one or more light emitting diodes in response to the second signal. Additionally, the system controller is configured to process information associated with the first signal, determine a first time period for the first signal to increase from a first threshold to a second threshold, and determine a second time period for the first signal to decrease from the second threshold to the first threshold. Moreover, the system controller is further configured to, in response to the second time period minus the first time period being larger than a predetermined positive value, determine the first signal to be associate with a leading-edge TRIAC dimmer, and in response to the first time period minus the second time period being larger than the predetermined positive value, determine the first signal to be associate with a trailing-edge TRIAC dimmer. Also, the system controller is further configured to, in response to an absolute value of the first time period minus the second time period being smaller than the predetermined positive value, determine the first signal not to be associated with any TRIAC dimmer.

According to another embodiment, a system controller for a lighting system includes a first controller terminal configured to receive a first signal associated with a TRIAC dimmer, and a second controller terminal configured to output a second signal to a current sink. The current sink is configured to receive a first current in response to the second signal. Additionally, the system controller includes a third controller terminal configured to output a third signal to a driver component. The driver component is configured to receive a second current and provide one or more drive currents to one or more light emitting diodes in response to the third signal. Moreover, the system controller includes a fourth controller terminal configured to receive a fourth signal. The fourth signal is related to a third current that flows through the TRIAC dimmer. Also, the system controller is configured to process information associated with the first signal, and determine the TRIAC dimmer is turned on at a first time based at least in part on the first signal. Additionally, the system controller is configured to, after the first time, with a first delay, decrease a duty cycle of the second signal from a first predetermined value until the fourth signal indicates that the TRIAC dimmer is turned off at a second time, and in response to the fourth signal indicating that the TRIAC dimmer is turned off at the second time, set a first threshold for the fourth signal, the first threshold being related to a holding current of the TRIAC dimmer. Moreover, the system controller is further configured to process information associated with the first signal, and determine the TRIAC dimmer is turned on at a third time based at least in part on the first signal. Also, the system controller is further configured to, after the third time, with a second delay, change the second signal from a first logic level to a second logic level and keep the second signal at the second logic level until a fourth time, and at the fourth time, change the second signal to a modulation signal to regulate the fourth signal at a second threshold in order to keep the fourth signal larger than the first threshold and keep the third current larger than the holding current of the TRIAC dimmer. The second threshold is larger than the first threshold, and the modulation signal changes between the first logic level and the second logic level.

According to yet another embodiment, a method for a lighting system includes receiving a first signal, processing information associated with the first signal, determining a first time period for the first signal to increase from a first threshold to a second threshold, determining a second time period for the first signal to decrease from the second threshold to the first threshold, and processing information associated with the first time period and the second time period. Additionally, the method includes, in response to the second time period minus the first time period being larger than a predetermined positive value, determining the first signal to be associate with a leading-edge TRIAC dimmer, and in response to the first time period minus the second time period being larger than the predetermined positive value, determining the first signal to be associate with a trailing-edge TRIAC dimmer. Moreover, the method includes, in response to an absolute value of the first time period minus the second time period being smaller than the predetermined positive value, determining the first signal not to be associated with any TRIAC dimmer.

According to yet another embodiment, a method for a lighting system includes receiving a first signal associated with a TRIAC dimmer, receiving a second signal related to a first current that flows through the TRIAC dimmer, processing information associated with the first signal, and determining the TRIAC dimmer is turned on at a first time based at least in part on the first signal. Additionally, the method includes, after the first time, with a first delay, decreasing a duty cycle of a third signal from a first predetermined value until the second signal indicates that the TRIAC dimmer is turned off at a second time, and setting a first threshold for the second signal in response to the second signal indicating that the TRIAC dimmer is turned off at the second time, the first threshold being related to a holding current of the TRIAC dimmer. Moreover, the method includes determining that the TRIAC dimmer is turned on at a third time based at least in part on the first signal, and after the third time, with a second delay, changing the third signal from a first logic level to a second logic level and keep the third signal at the second logic level until a fourth time. Also, the method includes at the fourth time, changing the third signal to a modulation signal to regulate the second signal at a second threshold in order to keep the second signal larger than the first threshold and keep the first current larger than the holding current of the TRIAC dimmer. The second threshold is larger than the first threshold, and the modulation signal changes between the first logic level and the second logic level.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for intelligent control related to TRIAC dimmers. Merely by way of example, some embodiments of the invention have been applied to driving light emitting diodes (LEDs). But it would be recognized that the invention has a much broader range of applicability.

As discussed earlier, various conventional technologies have been used to detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. These conventional technologies have various weaknesses.

In one conventional technology, a rectified output voltage generated by a rectifier is compared with a threshold voltage $V_{th\_on}$ in order to determine a turn-on time period $T_{on}$. This conventional technology, however, often cannot effectively distinguish the situation where no TRIAC dimmer is included in a lighting system from the situation where a trailing-edge TRIAC dimmer is included in a lighting system. In the situation where a trailing-edge TRIAC dimmer is included in a lighting system, the voltage generated by the trailing-edge TRIAC dimmer after the dimmer is turned off decreases slowly to the threshold voltage $V_{th\_on}$ due to charging and/or discharging of one or more capacitors. This slow reduction of the voltage makes it difficult to compare the turn-on time period $T_{on}$ and the duration of a half cycle of the AC input voltage; hence the determination about whether a TRIAC dimmer has been included in a lighting system and/or whether a trailing-edge TRIAC dimmer has been included in a lighting system becomes unreliable.

In another conventional technology, a rate of change of a rectified output voltage is used. The rectified output voltage is generated by a rectifier, and its rate of change is determined by quickly sampling the rectified voltage twice. Hence this conventional technology needs real-time fast calculation of rate of change between two successively sampled rectified voltage values, and also needs storage of various predetermined ranges for the rate of change that correspond to various phase angles at which these two sampling actions are taken. Such computation and storage often impose significant demand on bit depth of an analog-to-digital converter, computational capability of the system, and storage capacity of the system.

Figure 1:
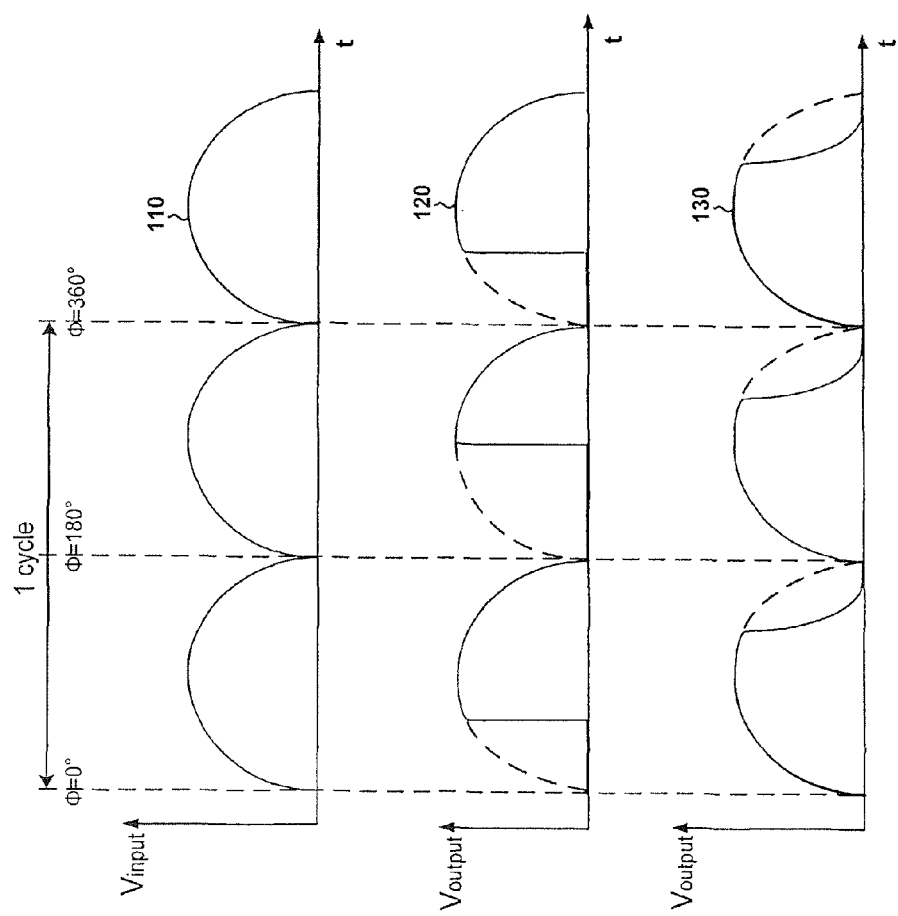
FIG. 1 shows certain conventional timing diagrams for a leading-edge TRIAC dimmer and a trailing-edge TRIAC dimmer.
Figure 2:
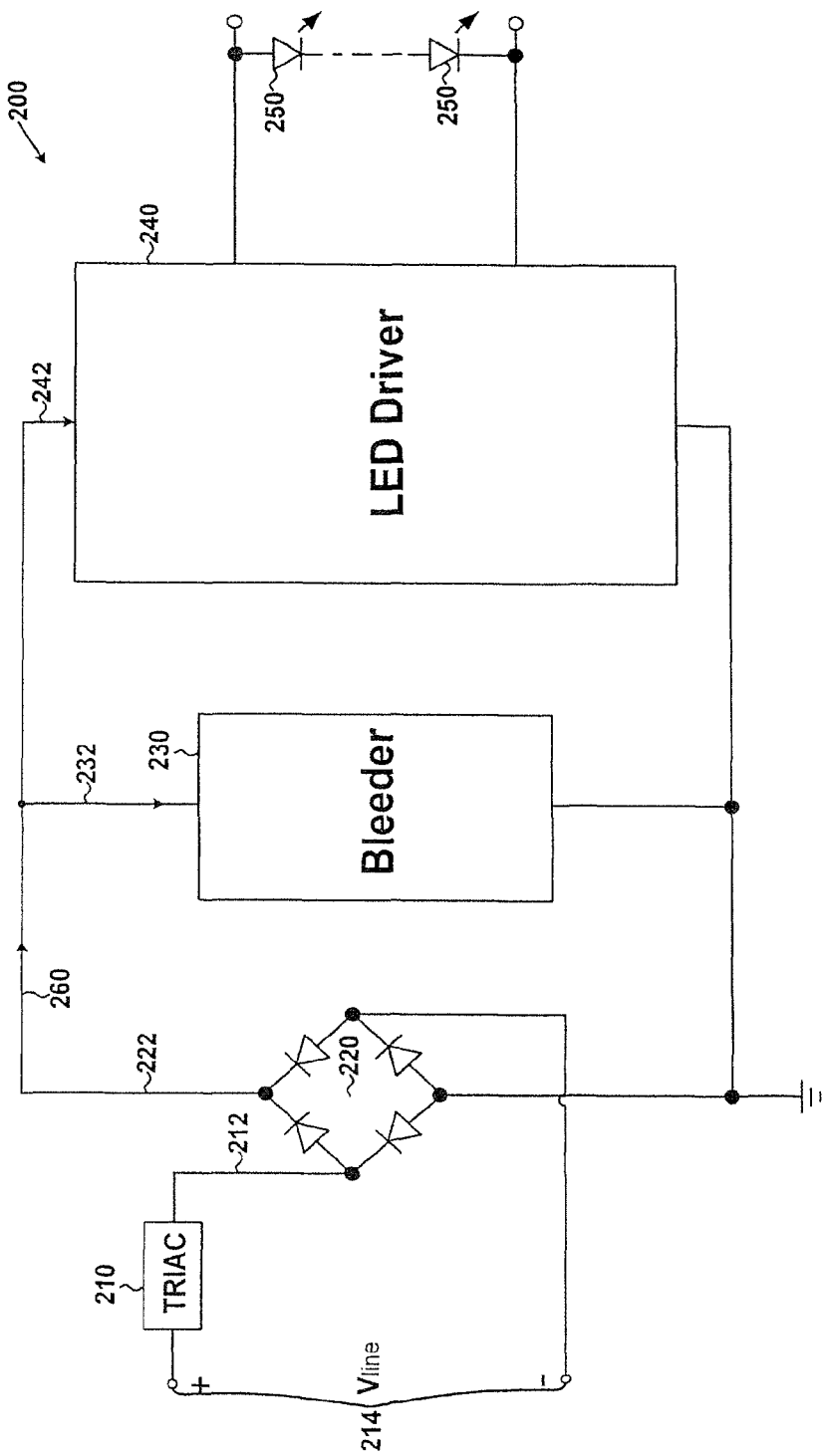
FIG. 2 is a simplified diagram of a conventional lighting system that includes a bleeder.
Figure 3:
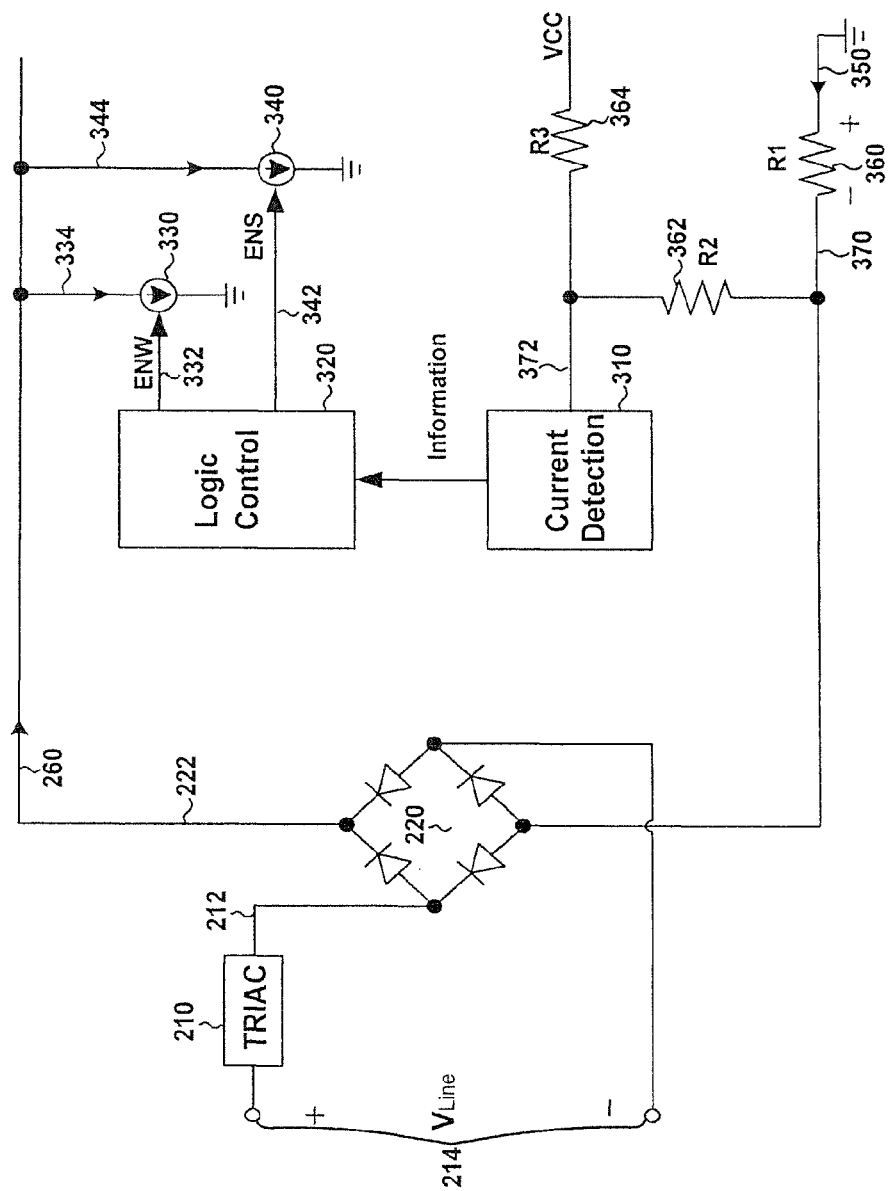
FIG. 3 is a simplified diagram showing certain conventional components of the bleeder as part of the lighting system as shown in FIG. 2.

Additionally, referring to FIG. 2, the current 232 is received by the bleeder 230. As shown in FIG. 3, the magnitude of the current 232 can change between two different predetermined magnitudes. The current 232 equals the current 334 or the current 344, and the current 344 is larger than the current 334 in magnitude. One weakness of this conventional technology as shown in FIGS. 2 and 3 is that the currents 334 and 344 each have a fixed magnitude. If the holding current of the TRIAC dimmer 210 is higher than both the currents 334 and 344 in magnitude, the LEDs 250 may flicker. If the holding current of the TRIAC dimmer 210 is lower than the current 344 but higher than the current 334 in magnitude, setting the current 232 equal to the current 334 may cause the LEDs 250 to flicker, but setting the current 232 equal to the current 344 may waste energy and thus lower efficiency of the system.

Moreover as discussed above, as shown in FIG. 2, the voltage 212 generated by the TRIAC dimmer 210 may have waveforms that are not symmetric between a positive half cycle and a negative half cycle of the AC input voltage 214. This lack of symmetry can cause the LEDs 250 to flicker at a fixed frequency (e.g., 50 Hz or 60 Hz). To resolve this issue, two turn-on time periods for the waveforms can be detected in real time. One of the two turn-on time periods corresponds to a positive half cycle, and the other of the two turn-on time periods corresponds to a negative half cycle that is neighboring to the positive half cycle. The waveform with the longer turn-on time period can, for example, be delayed in providing a current to the LEDs 250, so that the current received by the LEDs 250 is symmetric between the positive half cycle and the negative half cycle of the AC input voltage 214.

Additionally as discussed above, according to certain conventional technology, a single TRIAC dimmer (e.g., the TRIAC dimmer 210) and a single rectifier (e.g., the rectifier 220) are used to support multiple lamp subsystems that are connected in parallel. The sum of the rectified output currents of multiple lamp subsystems is equal to the current that flows through the TRIAC dimmer (e.g., the TRIAC dimmer 210), and often is much larger than the holding current of the TRIAC dimmer (e.g., the TRIAC dimmer 210). Such large magnitude for the sum of the rectified output currents of multiple lamp subsystems not only lowers efficiency of the system but also reduces the number of lamp subsystems that can be supported by the single TRIAC dimmer (e.g., the TRIAC dimmer 210) and the single rectifier (e.g., the rectifier 220).

Certain embodiments of the present invention provide an intelligent mechanism to match and control a TRIAC dimmer. According to one embodiment, the intelligent mechanism can reliably and automatically detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. For example, this reliable and automatic detection can help to select appropriate method of dimming control in order to improve energy efficiency of the system. According to another embodiment, the intelligent mechanism can automatically detect the holding current of the TRIAC dimmer, and use the closed-loop control to ensure the current that flows through the TRIAC dimmer is not lower than the holding current of the TRIAC dimmer.

According to another embodiment, the intelligent mechanism can provide to LEDs a current that is symmetric between the positive half cycle and the negative half cycle of an AC input voltage in order to prevent flickering of the LEDs that can be caused by an asymmetric current between the positive half cycle and the negative half cycle of the AC input voltage. According to yet another embodiment, if multiple lamp subsystems are connected in parallel, the intelligent mechanism can optimize each rectified output current for each lamp subsystem so that the sum of these rectified output currents is larger than but not too much larger than the holding current of the TRIAC dimmer in order to avoid flickering of LEDs that is caused by insufficient current flowing through the TRIAC dimmer. For example, such optimization of each rectified output current can help improve energy efficiency of the system. In another example, such optimization of each rectified output current can increase the number of lamp subsystems that can be supported by the system.

Figure 4:
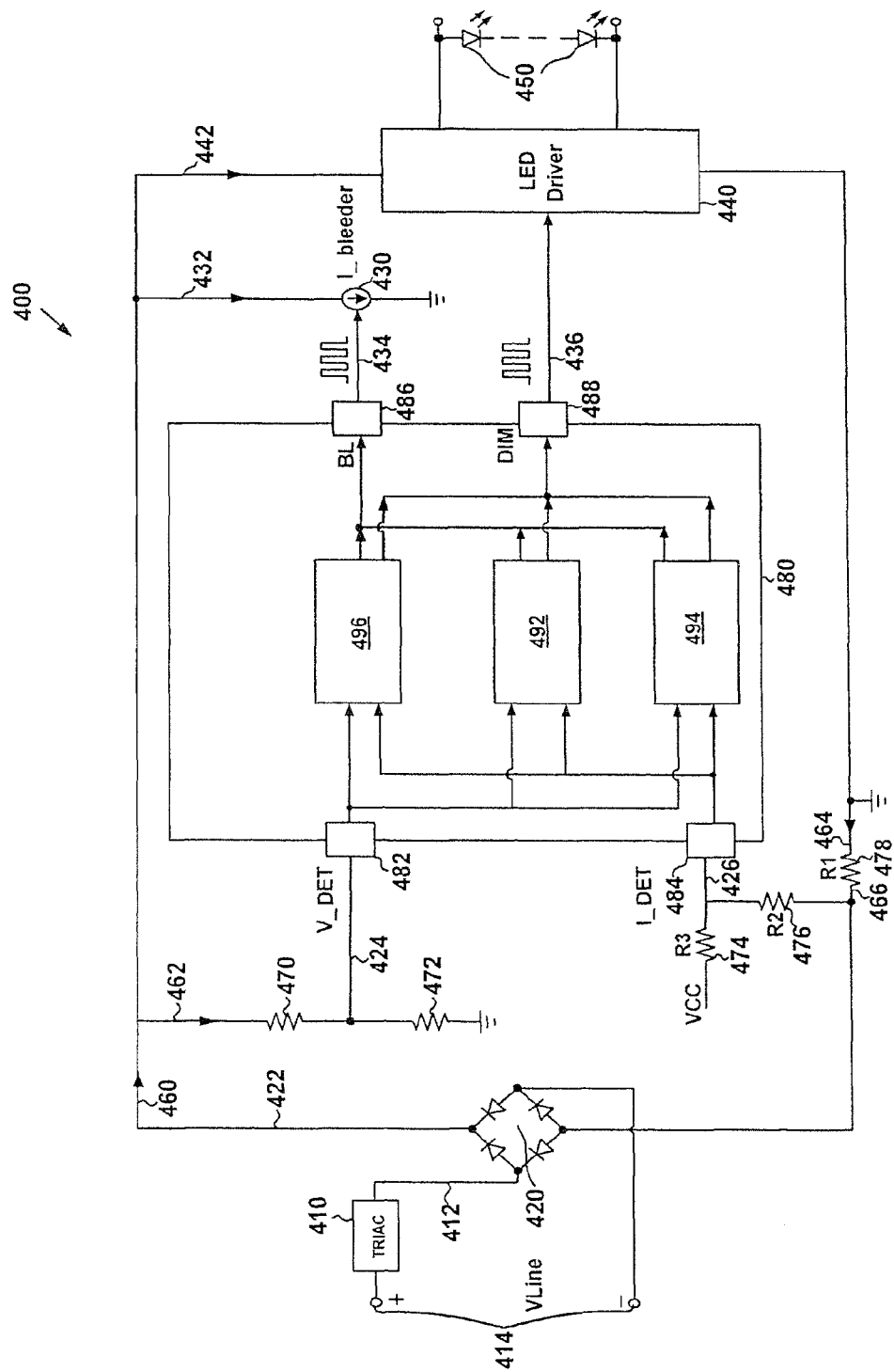
FIG. 4 is a simplified diagram of a lighting system according to an embodiment of the present invention.

FIG. 4 is a simplified diagram of a lighting system according to an embodiment of the present invention. This diagram is merely an example, which should not unduly limit the scope of the claims. One of ordinary skill in the art would recognize many variations, alternatives, and modifications. The lighting system 400 includes a TRIAC dimmer 410, a rectifier 420, a current sink 430, an LED driver 440, one or more LEDs 450, resistors 470, 472, 474, 476, and 478, and a system controller 480.

Although the above has been shown using a selected group of components for the lighting system 400, there can be many alternatives, modifications, and variations. In one embodiment, the TRIAC dimmer 410 is removed from the lighting system 400 so that the lighting system 400 does not include the TRIAC dimmer 410. In another embodiment, the TRIAC dimmer 410 and the rectifier 420 are used to support multiple lamp subsystems that are connected in parallel.

For example, each lamp subsystem includes a system controller (e.g., the system controller 480), and resistors (e.g., the resistors 470, 472, 474, 476, and 478), a current sink (e.g., the current sink 430), an LED driver (e.g., the LED driver 440), and one or more LEDs (e.g., the one or more LEDs 450). In another example, each lamp subsystem includes a rectifier (e.g., the rectifier 420), a system controller (e.g., the system controller 480), and resistors (e.g., the resistors 470, 472, 474, 476, and 478), a current sink (e.g., the current sink 430), an LED driver (e.g., the LED driver 440), and one or more LEDs (e.g., the one or more LEDs 450).

As shown in FIG. 4, the TRIAC dimmer 410 receives an AC input voltage 414 (e.g., $V_{line}$) and generates a voltage 412. For example, the voltage 412 is received by the rectifier 420 (e.g., a full wave rectifying bridge), which generates a rectified output voltage 422 and a rectified output current 460. In another example, the rectified output voltage 422 is received by a voltage divider including the resistors 470 and 472, and the voltage divider outputs a voltage 424.

In one embodiment, a current 464 flows through the resistor 478, which generates a voltage 466. For example, the current 464 is equal to the rectified output current 460 in magnitude. In another example, the voltage 466 is received by a voltage divider including the resistors 474 and 476, and the voltage divider outputs a voltage 426. In yet another example, the voltage 426 represents the rectified output current 460, which is equal to the current that flows through the TRIAC dimmer 410.

In another embodiment, the system controller 480 includes terminals 482, 484, 486, and 488, and processing components 492, 494, and 496. For example, the terminal 482 (e.g., the terminal "V_DET") receives the voltage 424. In another example, the terminal 484 (e.g., the terminal "I_DET") receives the voltage 426. In yet another example, the terminal 486 (e.g., the terminal "BL") outputs a control signal 434 (e.g., a pulse-width-modulation signal or an analog voltage signal) to the current sink 430. In yet another example, the terminal 488 (e.g., the terminal "DIM") outputs a control signal 436 (e.g., a pulse-width-modulation signal or an analog voltage signal) to the LED driver 440.

In yet another embodiment, the current sink 430, in response to the received signal 434, generates a current 432. For example, the signal 434 is an analog voltage signal that controls the magnitude of the current 432. In another example, the received signal 434 is a logic signal, which changes between a logic high level and a logic low level. According to one embodiment, if the received signal 434 is at the logic high level, the current sink 430 is turned on and the current 432 is equal to a predetermined current level that is larger than zero, and if the received signal 434 is at the logic low level, the current sink 430 is turned off and the current 432 is equal to zero. According to another embodiment, the ratio between the time period when the received signal 434 is at the logic high level and the time period when the received signal 434 is at the logic low level is used by the current sink 430 to determine the magnitude of the current 432. For example, if the ratio becomes smaller, the current 432 also becomes smaller in magnitude.

In yet another embodiment, the LED driver 440 is configured to receive the signal 436 and a current 442, and provide one or more drive currents to drive the one or more LEDs 450 in response to the signal 436. For example, the control signal 436 is a logic signal. In another example, if the control signal 436 is at the logic high level, the LED driver in response receives the current 442 and provides one or more drive currents to drive the one or more LEDs 450. In yet another example, if the control signal 436 is at the logic low level, in response, the current 442 is equal to zero and the one or more drive currents are also equal to zero. In yet another example, the control signal 436 is an analog signal, and the LED driver in response receives the current 442 and provides one or more drive currents to drive the one or more LEDs 450, where the one or more drive currents are proportional to the magnitude of the control signal 436.

In yet another embodiment, the rectified output current 460 is equal to the current that flows through the TRIAC dimmer 410, and is divided into a current 462 received by the resistor 470, the current 432 generated and received by the current sink 430, and the current 442 received by the LED driver 440. For example, the rectified output current 460 is equal to the sum of the current 462, the current 432, and the current 442. In another example, the rectified output current 460 is equal to the current 464 that is received by the resistor 478 in magnitude.

In yet another embodiment, the processing component 492 is configured to detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer. For example, the processing component 494 is configured to detect the holding current of the TRIAC dimmer 410, and use the closed-loop control to control the current 432. In another example, the processing component 496 is configured to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414. In yet another example, the processing component 492 is configured to, if the lighting system 400 includes the multiple lamp subsystems, control the current 432 for the lamp subsystem to which the system controller 480 belongs.

In yet another embodiment, the following processes (a), (b), and (c) are performed sequentially:
- (a) The system controller 480 uses the processing component 492 to detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer;
- (b) After the process (a) as described above, if the process (a) determines the TRIAC dimmer 410 is included in the lighting system 400, the system controller 480 uses the processing component 494 to detect the holding current of the TRIAC dimmer 410; and
- (c) After the processes (a) and (b) as described above, the process (c) is performed. During the process (c), the system controller 480 uses the processing component 494 to rely on the closed-loop control to control the current 432. Additionally, during the process (c), the system controller 480 uses the processing component 496 to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414.

As discussed above and further emphasized here, FIG. 4 is merely an example, which should not unduly limit the scope of the claims. One of ordinary skill in the art would recognize many variations, alternatives, and modifications. In one embodiment, the TRIAC dimmer 410 is removed from the lighting system 400, so that the lighting system 400 does not include the TRIAC dimmer 410 and the rectifier 420 directly receives the AC input voltage 414 and generates the rectified output voltage 422 and the rectified output current 460. In another embodiment, some (e.g., one or two) of the processing components 492, 494, and 496 are removed from the system controller 480.

As shown in FIG. 4, when the lighting system 400 is just turned on, the duty cycle of the signal 436 is equal to zero and hence the LED driver 440 does not operate according to certain embodiments. In one embodiment, immediately after the lighting system 400 is turned on, the system controller 480 uses the processing component 492 to first detect whether or not the TRIAC dimmer 410 is included in the lighting system 400, and if the TRIAC dimmer 410 is detected to be included in the lighting system 400, whether the TRIAC dimmer 410 is a leading-edge TRIAC dimmer or a trailing-edge TRIAC dimmer. In another embodiment, the processing component 492 uses the received voltage 424 to detect a rising time period (e.g., T_rise) during which the voltage 424 increases from a lower threshold voltage (e.g., Vth_off) to a higher threshold voltage (e.g., Vth_on) and to detect a falling time period (e.g., T_fall) during which the voltage 424 decreases from the higher threshold voltage (e.g., Vth_on) to the lower threshold voltage (e.g., Vth_off). For example, the processing component 492 compares the detected rising time (e.g., T_rise) and the detected falling time (e.g., T_fall) to determine whether or not the TRIAC dimmer 410 is included in the lighting system 400, and if the TRIAC dimmer 410 is determined to be included in the lighting system 400, whether the TRIAC dimmer 410 is a leading-edge TRIAC dimmer or a trailing-edge TRIAC dimmer.

Figure 5:
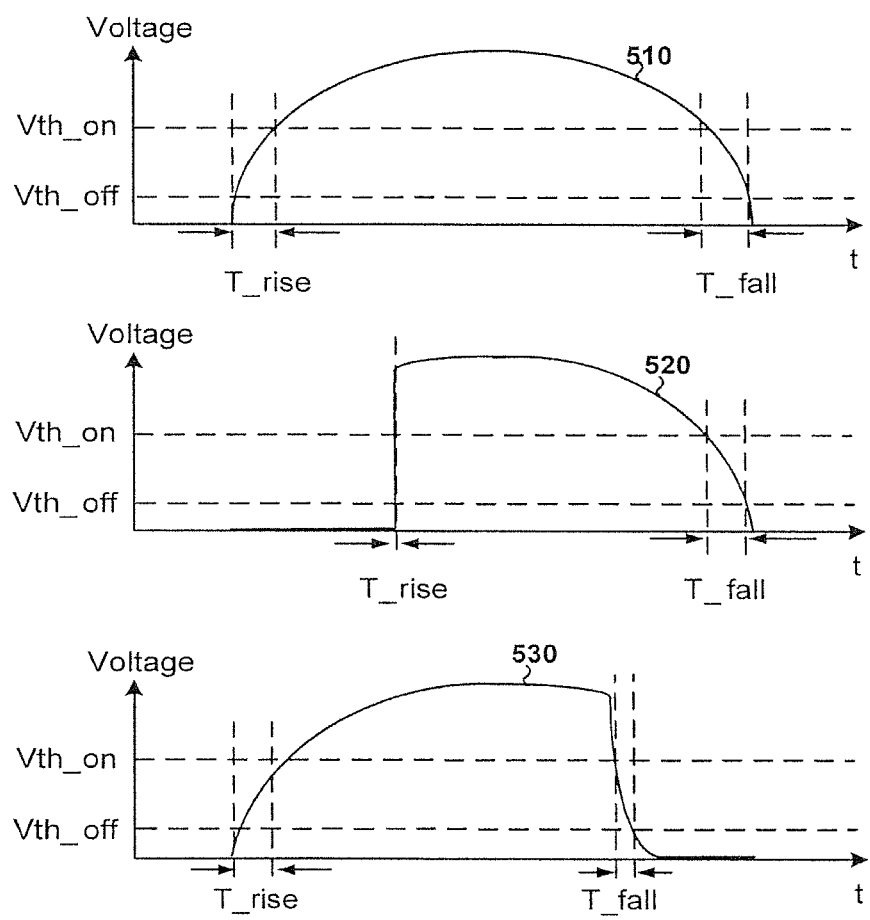
FIG. 5 shows certain timing diagrams for a processing component of a system controller as part of the lighting system as shown in FIG. 4 according to an embodiment of the present invention.

FIG. 5 shows certain timing diagrams for the processing component 492 of the system controller 480 as part of the lighting system 400 as shown in FIG. 4 according to an embodiment of the present invention. These diagrams are merely examples, which should not unduly limit the scope of the claims. One of ordinary skill in the art would recognize many variations, alternatives, and modifications.

For example, the waveform 510 represents the voltage 424 as a function of time during a half cycle of the AC input voltage 414 (e.g., $V_{line}$) if the lighting system 400 does not include the TRIAC dimmer 410 so that the rectifier 420 directly receives the AC input voltage 414 and generates the rectified output voltage 422 and the rectified output current 460. In another example, the waveform 520 represents the voltage 424 as a function of time during a half cycle of the AC input voltage 414 (e.g., $V_{line}$) if the lighting system 400 includes the TRIAC dimmer 410 and the TRIAC dimmer 410 is a leading-edge TRIAC dimmer. In yet another example, the waveform 530 represents the voltage 424 as a function of time during a half cycle of the AC input voltage 414 (e.g., $V_{line}$) if the lighting system 400 includes the TRIAC dimmer 410 and the TRIAC dimmer 410 is a trailing-edge TRIAC dimmer.

According to one embodiment, if the detected rising time (e.g., T_rise) is equal to or approximately equal to the detected falling time (e.g., T_fall), the processing component 492 determines that the TRIAC dimmer 410 is not included in the lighting system 400. According to another embodiment, if the detected rising time (e.g., T_rise) is smaller than the detected falling time (e.g., T_fall), the processing component 492 determines that the TRIAC dimmer 410 is included in the lighting system 400 and the TRIAC dimmer 410 is a leading-edge TRIAC dimmer. For example, for the leading-edge TRIAC dimmer, the voltage 424 increases rapidly so that the detected rising time (e.g., T_rise) is approximately equal to zero. In another example, comparing the detected rising time (e.g., T_rise) and the detected falling time (e.g., T_fall) can reliably detect whether or not the TRIAC dimmer 410 in the lighting system 400 is a leading-edge TRIAC dimmer. According to yet another embodiment, if the detected rising time (e.g., T_rise) is larger than the detected falling time (e.g., T_fall), the processing component 492 determines that the TRIAC dimmer 410 is included in the lighting system 400 and the TRIAC dimmer 410 is a trailing-edge TRIAC dimmer. For example, for the trailing-edge TRIAC dimmer, the voltage 424 decreases slowly due to charging and/or discharging of one or more capacitors so that the detected falling time (e.g., T_fall) is not approximately equal to zero. In another example, comparing the detected rising time (e.g., T_rise) and the detected falling time (e.g., T_fall) can reliably distinguish the situation where the TRIAC dimmer 410 is not included in the lighting system 400 from the situation where the TRIAC dimmer 410 in the lighting system 400 is a trailing-edge TRIAC dimmer.

According to certain embodiments, where $\Delta T$ is a predetermined threshold, (a) if $|T\_rise - T\_fall| \leq \Delta T$, the processing component 492 determines that the TRIAC dimmer 410 is not included in the lighting system 400;

(b) if $T\_fall - T\_rise > \Delta T$, the processing component 492 determines that the TRIAC dimmer 410 is included in the lighting system 400 and the TRIAC dimmer 410 is a leading-edge TRIAC dimmer; and (c) if $T\_rise - T\_fall > \Delta T$, the processing component 492 determines that the TRIAC dimmer 410 is included in the lighting system 400 and the TRIAC dimmer 410 is a trailing-edge TRIAC dimmer.

As shown in FIG. 4, after the processing component 492 has detected that the TRIAC dimmer 410 is included in the lighting system 400, and also determined whether the TRIAC dimmer 410 is a leading-edge TRIAC dimmer or a trailing-edge TRIAC dimmer, the processing component 494 is configured to detect the holding current of the TRIAC dimmer 410, and use the closed-loop control to control the current 432 according to certain embodiments.

Figure 6:
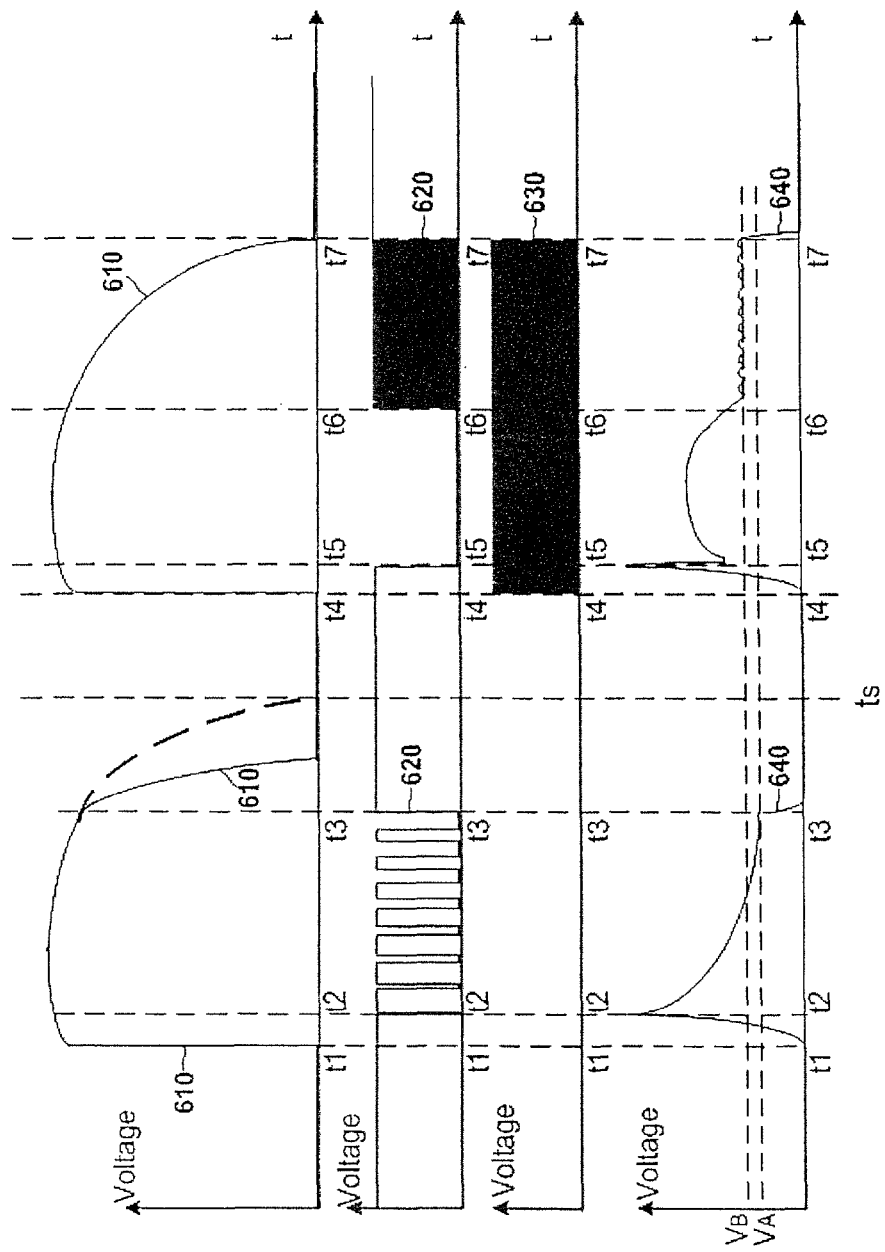
FIG. 6 shows certain timing diagrams for another processing component of the system controller as part of the lighting system as shown in FIG. 4 if a TRIAC dimmer is includes in the lighting system and the TRIAC dimmer is a leading-edge TRIAC dimmer according to an embodiment of the present invention.

FIG. 6 shows certain timing diagrams for the processing component 494 of the system controller 480 as part of the lighting system 400 as shown in FIG. 4 if the TRIAC dimmer 410 is includes in the lighting system 400 and the TRIAC dimmer 410 is a leading-edge TRIAC dimmer 410 according to an embodiment of the present invention. These diagrams are merely examples, which should not unduly limit the scope of the claims. One of ordinary skill in the art would recognize many variations, alternatives, and modifications. According to some embodiments, the waveform 610 represents the voltage 424 as a function of time, the waveform 620 represents the signal 434 as a function of time, the waveform 630 represents the signal 436 as a function of time, and the waveform 640 represents the voltage 426 as a function of time. According to certain embodiments, the processing component 494 is configured to detect the holding current of the TRIAC dimmer 410 before time $t_s$, and use the closed-loop control to control the current 432 after time $t_s$.

In one embodiment, the processing component 494 receives the voltage 424, and based on the received voltage 424, determines that the TRIAC dimmer 410 is turned on at time $t_1$, as shown by the waveform 610. In response, after time $t_1$, the system controller 480, including the processing component 494, generates the signal 434 so that the signal 434 is at the maximum duty cycle immediately after time $t_1$, but the duty cycle of the signal 434 then decreases with time from the maximum duty cycle, according to some embodiments. For example, if the signal 434 is at the maximum duty cycle, the current 432 reaches a maximum magnitude. In another example, if the current 432 reaches a maximum magnitude, the current 460 also reaches a maximum magnitude and the voltage 426 reaches a corresponding maximum magnitude at time $t_2$, as shown by the waveform 640. In yet another example, the maximum magnitude of the current 460 is high than the holding current of the TRIAC dimmer 410, so that the TRIAC dimmer 410 remains to be turned on at time $t_2$.

In yet another embodiment, if the duty cycle of the signal 434 decreases with time from the maximum duty cycle as shown by the waveform 610, the voltage 426, which represents the current 460, also decreases with time from the maximum magnitude as shown by the waveform 640. For example, if the current 460, which is equal to the current flowing through the TRIAC dimmer 410, becomes smaller than the holding current of the TRIAC dimmer 410, the TRIAC dimmer 410 is turned off. In yet another example, in response to the TRIAC dimmer 410 being turned off, the decrease of the voltage 424 becomes steeper at time $t_3$ as shown by the waveform 610 and the decrease of the voltage 426 also becomes steeper at time $t_3$ as shown by the waveform 640. In yet another example, the processing component 494 is configured to detect an abrupt change of slope at which the voltage 426 decreases, and set a threshold magnitude $V_A$ for the voltage 426 based at least in part on the detected abrupt change of slope.

In yet another embodiment, the threshold magnitude $V_A$ of the voltage 426 at time $t_3$ corresponds to the holding current of the TRIAC dimmer 410. For example, $V_A$ represents the holding current as detected by the process. In yet another embodiment, the system controller 480 sets a threshold magnitude $V_B$ for the voltage 426. For example, $V_B$ is larger than $V_A$. In another example, $V_B = V_A + \Delta V_1$, where $\Delta V_1$ is a predetermined threshold and is larger than zero. In yet another example, $V_B = k \times V_A$, where k is a constant that is larger than or equal to 1.05 but smaller than or equal to 1.3. In yet another example, if the voltage 426 is approximately equal to $V_B$, the current flowing through the TRIAC dimmer 410 is larger than the holding current of the TRIAC dimmer 410, so long as the voltage 426 remains larger than $V_A$. In yet another example, the system controller 480 stores the threshold magnitude $V_B$.

As shown in FIG. 6, after time $t_s$, the processing component 494 is configured to use the threshold magnitude $V_B$ to perform the closed-loop control to control the voltage 426 by controlling the current 432 according to some embodiments. For example, time $t_s$ is the beginning of the next half cycle of the AC input voltage 414. In another example, the voltage 426 represents the current that flows through the TRIAC dimmer 410, so the system controller 480 controls the current flowing through the TRIAC dimmer 410 by controlling the current 432 and the voltage 426.

In one embodiment, the processing component 494 receives the voltage 424, and based on the received voltage 424, determines that the TRIAC dimmer 410 is turned on at time $t_4$, as shown by the waveform 610. In response, the signal 436 generated by the system controller 480 becomes a modulation signal (e.g., a pulse-width-modulation signal) at time $t_4$, changing between a logic high level and a logic low level according to another embodiment, as shown by the waveform 630. For example, the signal 436 remains at the logic low level from time $t_1$ to time $t_4$. In another example, the signal 436 is a modulation signal (e.g., a pulse-width-modulation signal) from time $t_4$ to time $t_7$. In yet another example, the pulse-width-modulation signal 436 has a pulse width that corresponds to the dimming control as reflected by the time duration from time $t_1$ to time $t_s$.

In yet another embodiment, the signal 434 generated by the system controller 480 remains at the logic high level from time $t_3$ to time $t_5$, and time $t_5$ follows time $t_4$. For example, at time $t_5$, the signal 434 changes from the logic high level to the logic low level. In another example, from time $t_4$ to time $t_5$, the current 432 increases with time and reaches a maximum magnitude at time $t_5$. In yet another example, at time $t_5$, the current 460 also reaches a maximum magnitude and the voltage 426 reaches a corresponding maximum magnitude at time $t_5$, as shown by the waveform 640. In yet another example, the maximum magnitude of the current 460 is high than the holding current of the TRIAC dimmer 410, so that the TRIAC dimmer 410 remains to be turned on at time $t_5$.

In yet another embodiment, from time $t_5$ and time $t_6$, the signal 434 remains at the logic low level. For example, from time $t_5$ and time $t_6$, the voltage 426 becomes smaller than the corresponding maximum magnitude that the voltage 426 reaches at time $t_5$. In another example, at time $t_6$, the voltage 426 becomes smaller than $V_B + \Delta V_2$, even though the voltage 426 is still larger than $V_B$, where $V_B$ represents the threshold magnitude that is stored by the system controller 480, and $\Delta V_2$ represents a predetermined threshold that is larger than zero. In yet another example, at time $t_6$, in response to the voltage 426 becoming becomes smaller than $V_B + \Delta V_2$, even though still larger than the threshold magnitude $V_B$, the signal 434 generated by the system controller 480 becomes a modulation signal at time $t_6$, changing between a logic high level and a logic low level, as shown by the waveform 620.

According to one embodiment, the signal 434 is a modulation signal from time $t_6$ to time $t_7$. For example, from time $t_6$ to time $t_7$, the signal 434 as a modulation signal regulates the voltage 426 at the threshold magnitude $V_B$, and the voltage 426 becomes approximately equal to the threshold magnitude $V_B$ by a closed-loop regulation, so that the voltage 426 remains larger than the magnitude $V_A$ of the voltage 426 from time $t_6$ to time $t_7$, where the magnitude $V_A$ of the voltage 426 corresponds to the holding current of the TRIAC dimmer 410.

In another example, from time $t_6$ to time $t_7$, the current flowing through the TRIAC dimmer 410 remains larger than the holding current of the TRIAC dimmer 410, so that the TRIAC dimmer 410 is not turned off by the insufficient current flowing through the TRIAC dimmer 410.

According to another embodiment, time $t_7$ is the end of the half cycle of the AC input voltage 414 that starts at time $t_s$, and time $t_7$ is also the beginning of another half cycle of the AC input voltage 414. For example, as shown by the waveform 610, the voltage 424 becomes zero at time $t_7$ and remains to be zero until the TRIAC dimmer 410 is turned on. In another example, as shown by the waveform 620, the signal 434 is at the logic high level at time $t_7$, and remains at the logic high level until sometime after the TRIAC dimmer 410 is turned on. In yet another example, as shown by the waveform 630, the signal 436 is at the logic low level at time $t_7$, and remains at the logic low level until the TRIAC dimmer 410 is turned on. In yet another example, as shown by the waveform 640, the voltage 426 decreases to zero soon after time $t_7$, and remains to be zero until the TRIAC dimmer 410 is turned on.

As discussed above and further emphasized here, FIG. 6 is merely an example, which should not unduly limit the scope of the claims. One of ordinary skill in the art would recognize many variations, alternatives, and modifications. For example, the waveforms 610, 620, 630 and 640 are changed if the TRIAC dimmer 410 is includes in the lighting system 400 and the TRIAC dimmer 410 is a trailing-edge TRIAC dimmer, instead of a leading-edge TRIAC dimmer 410. In another example, the waveforms 610, 620, 630 and 640 are changed if the TRIAC dimmer 410 is not included in the lighting system 400. In yet another example, FIG. 6 is used to describe certain operations of FIG. 8. In yet another example, FIG. 6 is used to describe certain operations of FIG. 9.

As shown in FIG. 4, the processing component 496 is configured to process the voltage 424 that has waveforms not symmetric between a positive half cycle and a negative half cycle of the AC input voltage 414, so that the system controller 480 can provide to the one or more LEDs 450 a current that is symmetric between the positive half cycle and the negative half cycle of the AC input voltage 414 according to some embodiments.

Figure 7:
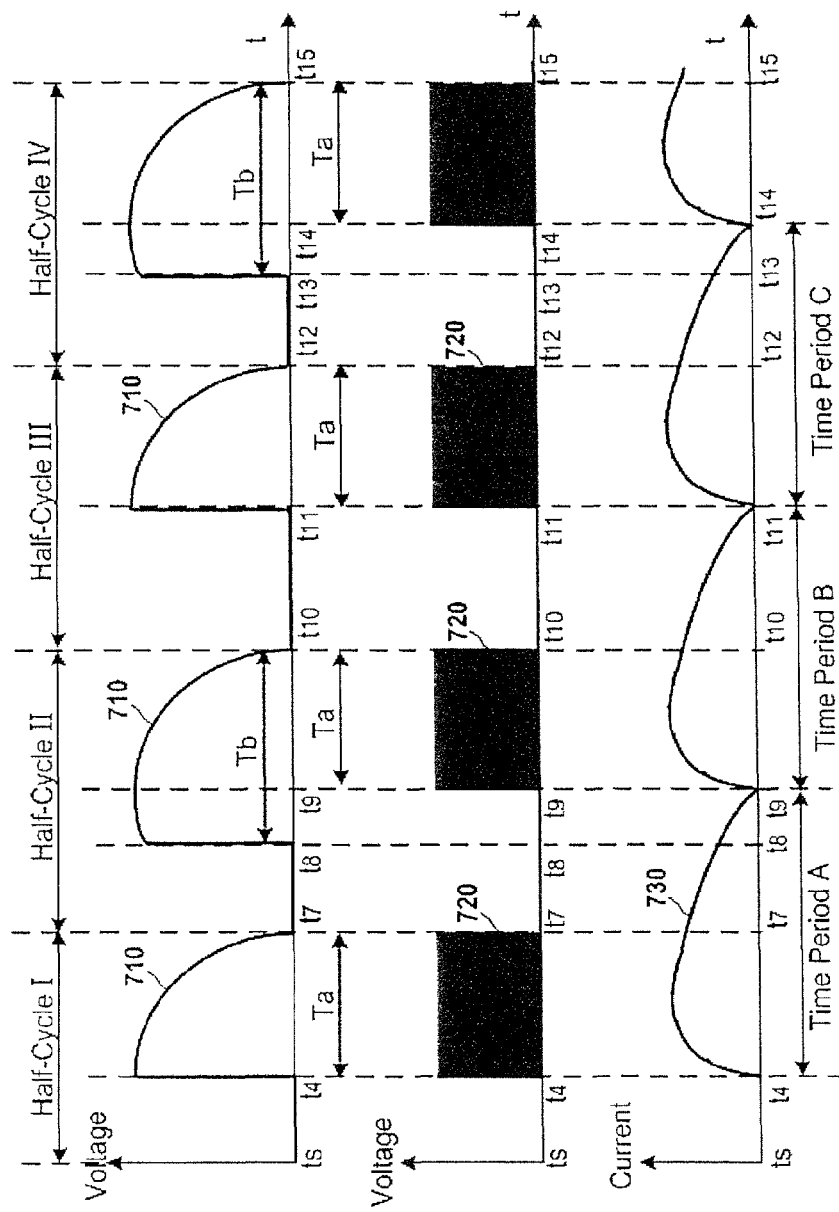
FIG. 7 shows certain timing diagrams for yet another processing component of the system controller as part of the lighting system as shown in FIG. 4 if a TRIAC dimmer is includes in the lighting system and the TRIAC dimmer is a leading-edge TRIAC dimmer according to an embodiment of the present invention.

FIG. 7 shows certain timing diagrams for the processing component 496 of the system controller 480 as part of the lighting system 400 as shown in FIG. 4 if the TRIAC dimmer 410 is includes in the lighting system 400 and the TRIAC dimmer 410 is a leading-edge TRIAC dimmer 410 according to an embodiment of the present invention. These diagrams are merely examples, which should not unduly limit the scope of the claims. One of ordinary skill in the art would recognize many variations, alternatives, and modifications. According to some embodiments, the waveform 710 represents the voltage 424 as a function of time, the waveform 720 represents the signal 436 as a function of time, and the waveform 730 represents the current that flows through the one or more LEDs 450 as a function of time. According to certain embodiments, the processing component 496 is configured to work with the processing component 494, wherein the processing component 494 uses the closed-loop control to control the current 432 and the processing component 496 processes the voltage 424 that has waveforms not symmetric between a positive half cycle and a negative half cycle of the AC input voltage 414.

In one embodiment, the processing component 494 receives the voltage 424, and based on the received voltage 424, determines that the TRIAC dimmer 410 is turned on at time $t_4$, as shown by the waveform 710. In response, the signal 436 generated by the system controller 480 becomes a modulation signal (e.g., a pulse-width-modulation signal) at time $t_4$, changing between a logic high level and a logic low level according to another embodiment, as shown by the waveform 720. For example, the signal 436 is at the logic low level before time $t_4$. In another example, the signal 436 is a modulation signal (e.g., a pulse-width-modulation signal) from time $t_4$ to time $t_7$. In yet another embodiment, time $t_7$ is the end of the half cycle of the AC input voltage 414, during which the voltage 426 has a pulse width of $T_a$ from time $t_4$ to time $t_7$. For example, time $t_7$ is also the beginning of another half cycle of the AC input voltage 414, during which the voltage 426 has a pulse width of $T_b$ from time $t_8$ to time $t_{10}$. In another example, the pulse width of $T_b$ is larger than the pulse width of $T_a$.

According to one embodiment, the processing component 494 detects the pulse width of $T_a$ and the pulse width of $T_b$, which correspond to two successive half cycles of the AC input voltage 414, and the processing component 494 also determines that the pulse width of $T_b$ is larger than the pulse width of $T_a$. For example, the processing component 494 detects the pulse width $T_b$ during the half cycle of the AC input voltage 414 that ends at time $t_s$, and detects the pulse width $T_a$ during the half cycle of the AC input voltage 414 that starts at time $t_s$.

According to another embodiment, the processing component 494 receives the voltage 424, and determines that the TRIAC dimmer 410 is turned on at time $t_8$ with the pulse width of $T_b$ for the voltage 424 as shown by the waveform 710. In response, the system controller 480, for example, keeps the signal 436 at the logic level from time $t_8$ to time $t_9$; then, at time $t_9$, the signal 436 becomes a modulation signal (e.g., a pulse-width-modulation signal) that changes between a logic high level and a logic low level as shown by the waveform 720. In another example, the signal 436 is a modulation signal (e.g., a pulse-width-modulation signal) from time $t_9$ to time $t_{10}$. In yet another example, the time duration from time $t_9$ to time $t_{10}$ is equal to the pulse width of $T_a$, the same as the time duration from time $t_4$ to time $t_7$.

According to yet another embodiment, time $t_{10}$ is the end of the half cycle of the AC input voltage 414, during which the voltage 426 has a pulse width of $T_b$ from time $t_8$ to time $t_{10}$. For example, time $t_{10}$ is also the beginning of another half cycle of the AC input voltage 414, during which the voltage 426 has a pulse width of $T_a$ from time $t_{11}$ to time $t_{12}$. In response, for example, the signal 436 generated by the system controller 480, at time $t_{11}$, becomes a modulation signal (e.g., a pulse-width-modulation signal) that changes between a logic high level and a logic low level as shown by the waveform 720. In another example, the signal 436 is a modulation signal (e.g., a pulse-width-modulation signal) from time $t_{11}$ to time $t_{12}$. In yet another example, the time duration from time $t_{11}$ to time $t_{12}$ is equal to the pulse width of $T_a$, the same as the time duration from time $t_9$ to time $t_{10}$.

According to yet another embodiment, the processing component 494 receives the voltage 424, and determines that the TRIAC dimmer 410 is turned on at time $t_{13}$ with the pulse width of $T_b$ for the voltage 424 as shown by the waveform 710. In response, the system controller 480, for example, keeps the signal 436 at the logic level from time $t_{13}$ to time $t_{14}$; then, at time $t_{14}$, the signal 436 becomes a modulation signal (e.g., a pulse-width-modulation signal) that changes between a logic high level and a logic low level as shown by the waveform 720. In another example, the signal 436 is a modulation signal (e.g., a pulse-width-modulation signal) from time $t_{14}$ to time $t_{15}$. In yet another example, the time duration from time $t_{14}$ to time $t_{15}$ is equal to the pulse width of $T_a$, the same as the time duration from time $t_9$ to time $t_{10}$. According to yet another embodiment, time $t_{15}$ is the end of the half cycle of the AC input voltage 414, during which the voltage 426 has a pulse width of $T_b$ from time $t_{13}$ to time $t_{15}$. For example, time $t_{15}$ is also the beginning of another half cycle of the AC input voltage 414, during which the voltage 426 has a pulse width of $T_a$.

As shown in FIG. 7, even though the pulse width of the voltage 424 is equal to $T_a$ in the half cycle I of the AC input voltage 414, is equal to $T_b$ in the half cycle II of the AC input voltage 414, is equal to $T_a$ in the half cycle III of the AC input voltage 414, and is equal to $T_b$ in the half cycle IV of the AC input voltage 414, the signal 436 is a modulation signal (e.g., a pulse-width-modulation signal) for a time duration equal to the pulse width of $T_a$ in each of the half cycle I of the AC input voltage 414, the half cycle II of the AC input voltage 414, the half cycle III of the AC input voltage 414, and the half cycle IV of the AC input voltage 414, according to certain embodiments. For example, the pulse width of $T_b$ is larger than the pulse width of $T_a$. In another example, as shown by the waveform 710, the pulse width of the voltage 424 changes from one half cycle of the AC input voltage 414 to another half cycle I of the AC input voltage 414, but the current that flows through the one or more LEDs 450 remains periodic as shown by the waveform 730. In yet another example, the waveform for the current that flows through the one or more LEDs 450 changes in the same way during the time period A (e.g., from time $t_4$ to time $t_9$), the time period B (e.g., from time $t_9$ to time $t)_{11}$, and the time period C (e.g., from time $t_{11}$ to time $t_{13}$). In yet another example, the waveform for the current that flows through the one or more LEDs 450 is symmetric between a positive half cycle and a negative half cycle of the AC input voltage 414 (e.g., between the half cycle II and the half cycle III as shown in FIG. 7).

Figure 8:
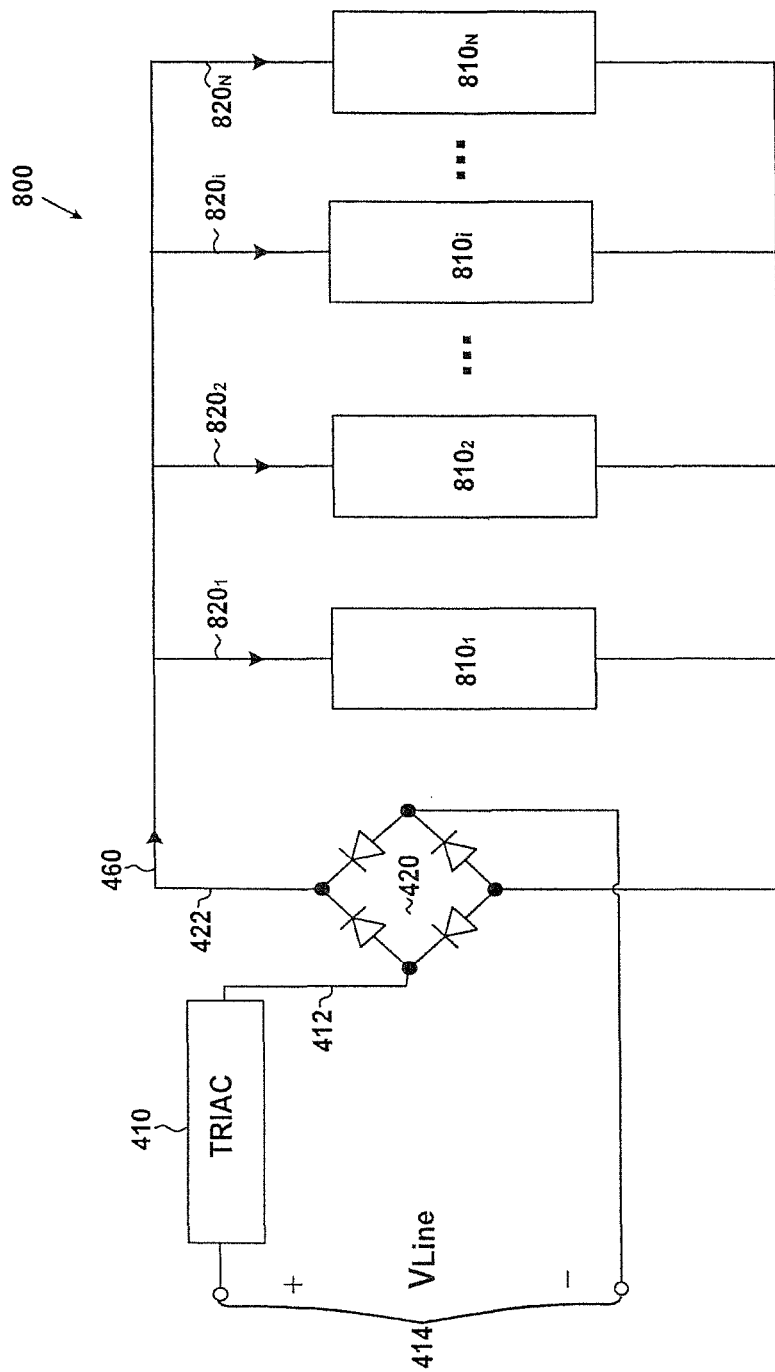
FIG. 8 is a simplified diagram of a lighting system that includes multiple lamp subsystems according to an embodiment of the present invention.

FIG. 8 is a simplified diagram of a lighting system that includes multiple lamp subsystems according to an embodiment of the present invention. This diagram is merely an example, which should not unduly limit the scope of the claims. One of ordinary skill in the art would recognize many variations, alternatives, and modifications. The lighting system 800 includes a TRIAC dimmer 410, a rectifier 420, and multiple lamp subsystems $810_1$, $810_2$, ... $810_i$, ... and $810_N$, wherein N is an integer that is larger than 1, and i is an integer that is larger than or equal to 1 and is smaller than or equal to N.

In one embodiment, each of the multiple lamp subsystems includes a current sink (e.g., a current sink 430), an LED driver (e.g., an LED driver 440), one or more LEDs (e.g., one or more LEDs 450), resistors (e.g., resistors 470, 472, 474, 476, and 478), and a system controller (e.g., a system controller 480). For example, the system controller (e.g., the system controller 480) of each of the multiple lamp subsystems includes terminals (e.g., terminals 482, 484, 486, and 488), and processing components (e.g., processing components 492, 494, and 496). In another embodiment, the lamp subsystem $810_i$ includes a current sink $430_i$, an LED driver $440_i$, one or more LEDs $450_i$, resistors $470_i$, $472_i$, $474_i$, $476_i$, and $478_i$, and a system controller $480_i$.

As shown in FIG. 8, the TRIAC dimmer 410 receives an AC input voltage 414 (e.g., $V_{line}$) and generates a voltage 412. For example, the voltage 412 is received by the rectifier 420 (e.g., a full wave rectifying bridge), which generates a rectified output voltage 422 and a rectified output current 460. In another example, the rectified output voltage 422 is received by a voltage divider including the resistors $470_i$ and $472_i$, and the voltage divider outputs a voltage $424_i$.

For example, the system controller $480_i$ includes terminals $482_i$, $484_i$, $486_i$, and $488_i$, and processing components $492_i$, $494_i$, and $496_i$. In another example, the terminal $484_i$ (e.g., the terminal "I_DET") receives a voltage $426_i$. In yet another example, the terminal $486_i$ (e.g., the terminal "BL") outputs a control signal $434_i$ (e.g., a pulse-width-modulation signal or an analog voltage signal) to the current sink $430_i$ to control a current $432_i$. In yet another example, the terminal $488_i$ (e.g., the terminal "DIM") outputs a control signal $436_i$ (e.g., a pulse-width-modulation signal or an analog voltage signal) to the LED driver $440_i$. In yet another example, the current $432_i$ is smaller than or equal to a current $820_i$ that flows into the lamp subsystem $810_i$.

In yet another embodiment, the rectified output current 460 is equal to the current flowing through the TRIAC dimmer 410, and is also equal to the sum of a current $820_1$, a current $820_2$, ..., a current $820_i$, ... and a current $820_N$. For example, the current $820_1$, the current $820_2$, ..., the current $820_i$, ... and the current $820_N$ are currents that flow into the lamp subsystems $810_1$, $810_2$, ... $810_i$, ... and $810_N$, respectively. In another example, the current $820_1$, the current $820_2$, ..., the current $820_i$, ... and the current $820_N$ each are a component of the rectified output current 460, and each represent a component of the current flowing through the TRIAC dimmer 410. In yet another example, the voltage $426_i$ represents the current $820_i$, and also represents a component of the current flowing through the TRIAC dimmer 410.

In yet another embodiment, the current $820_i$ is divided into a current $462_i$ received by the resistor $470_i$, the current $432_i$ generated and received by the current sink $430_i$, and a current $442_i$ received by the LED driver $440_i$. For example, the current $820_i$ is equal to the sum of the current $462_i$, the current $432_i$, and the current $442_i$.

According to one embodiment, after the processing component $492_i$ has detected that the TRIAC dimmer 410 is included in the lighting system 800, and after the processing component $492_i$ has also determined whether the TRIAC dimmer 410 is a leading-edge TRIAC dimmer or a trailing-edge TRIAC dimmer, the processing component $494_i$ of the lamp subsystem $810_i$ uses the closed-loop control to control the current $432_i$. For example, the multiple lamp subsystems $810_1$, $810_2$, ... $810_i$, ... and $810_N$ together satisfy the following equation:

$$I_{holding} < \sum_{i=1}^{N} I_i < I_{holding} \times N \quad \text{(Equation 1)}$$

wherein $I_{holding}$ represents the magnitude of the holding current of the TRIAC dimmer 410, and $I_i$ represents the magnitude of the current $820_i$. N is an integer that is larger than 1, and i is an integer that is larger than or equal to 1 and is smaller than or equal to N.

As discussed above and further emphasized here, FIG. 6 is merely an example, which should not unduly limit the scope of the claims. One of ordinary skill in the art would recognize many variations, alternatives, and modifications. For example, FIG. 6 is used to describe certain operations of FIG. 8.

According to some embodiments, the waveform 610 represents the voltage $424_i$ as a function of time, the waveform 620 represents the signal $434_i$ as a function of time, the waveform 630 represents the signal $436_i$ as a function of time, and the waveform 640 represents the voltage $426_i$ as a function of time. According to certain embodiments, all of the processing components $494_i$ are configured to detect the holding current of the TRIAC dimmer 410 before time $t_s$, and each use the closed-loop control to control the current $432_i$ after time $t_s$.

In one embodiment, the processing component $494_i$ receives the voltage $424_i$, and based on the received voltage $424_i$, determines that the TRIAC dimmer 410 is turned on at time $t_1$, as shown by the waveform 610. In response, after time $t_1$, the system controller $480_i$, including the processing component $494_i$, generates the signal $434_i$ so that the signal $434_i$ is at the maximum duty cycle immediately after time $t_1$, but the duty cycle of the signal $434_i$ then decreases with time from the maximum duty cycle, according to some embodiments. For example, if the signal $434_i$ is at the maximum duty cycle, the current $432_i$ reaches a maximum magnitude.

In another example, if all of the currents $432_i$, where i is an integer that is larger than or equal to 1 and is smaller than or equal to N, each reach a maximum magnitude, all of the voltages $426_i$ each reach a corresponding maximum magnitude at time $t_2$ as shown by the waveform 640, and the current 460 also reaches a maximum magnitude. In yet another example, the maximum magnitude of the current 460 is high than the holding current of the TRIAC dimmer 410, so that the TRIAC dimmer 410 remains to be turned on at time $t_2$.

In yet another embodiment, if the duty cycle of the signal $434_i$ decreases with time from the maximum duty cycle as shown by the waveform 610, the voltage $426_i$, which represents the current $820_i$, also decreases with time from the maximum magnitude as shown by the waveform 640. For example, if all of the currents $820_i$, where i is an integer that is larger than or equal to 1 and is smaller than or equal to N, each decrease with time from the maximum magnitude, the current 460 also decreases with time from its maximum magnitude. In another example, the current 460, which is equal to the current flowing through the TRIAC dimmer 410, becomes smaller than the holding current of the TRIAC dimmer 410, the TRIAC dimmer 410 is turned off. In yet another example, in response to the TRIAC dimmer 410 being turned off, the decrease of the voltage $424_i$ becomes steeper at time $t_3$ as shown by the waveform 610 and the decrease of the voltage $426_i$ also becomes steeper at time $t_3$ as shown by the waveform 640.

In yet another embodiment, the magnitude $V_A$ of the voltage $426_i$ at time $t_3$ corresponds to one component of multiple components of the holding current of the TRIAC dimmer 410. For example, if all of the voltages $426_i$ each are equal to their corresponding magnitudes $V_A$, the current 460 is equal to the holding current of the TRIAC dimmer 410.

In yet another embodiment, the system controller $480_i$ sets a threshold magnitude $V_B$ for the voltage $426_i$. For example, $V_B$ is larger than $V_A$. In another example, $V_B = V_A + \Delta V_1$, where $\Delta V_1$ is a predetermined threshold and is larger than zero. In yet another example, $V_B = k \times V_A$, where k is a constant that is larger than or equal to 1.05 but smaller than or equal to 1.3. In yet another example, if all of the voltages $426_i$ each are approximately equal to their corresponding $V_B$, the current flowing through the TRIAC dimmer 410 is larger than the holding current of the TRIAC dimmer 410, so long as the voltage $426_i$ remains larger than $V_A$. In yet another example, the system controller $480_i$ stores the corresponding threshold magnitude $V_B$.

As shown in FIG. 6, after time $t_s$, the processing component $494_i$ is configured to use the threshold magnitude $V_B$ to perform the closed-loop control to control the voltage $426_i$ by controlling the current $432_i$ according to some embodiments. For example, time $t_s$ is the beginning of the next half cycle of the AC input voltage 414. In another example, the voltage $426_i$ represents the current $820_i$, and sum of all of the currents $820_i$ is equal to the current that flows through the TRIAC dimmer 410, so all of the system controllers $480_i$ together can control the current flowing through the TRIAC dimmer 410 by each controlling the current $432_i$ and the voltage $426_i$.

In one embodiment, the processing component $494_i$ receives the voltage $424_i$, and based on the received voltage $424_i$, determines that the TRIAC dimmer 410 is turned on at time $t_4$, as shown by the waveform 610. In response, the signal $436_i$ generated by the system controller $480_i$ becomes a modulation signal (e.g., a pulse-width-modulation signal) at time $t_4$, changing between a logic high level and a logic low level according to another embodiment, as shown by the waveform 630. For example, the signal $436_i$ remains at the logic low level from time $t_1$ to time $t_4$. In another example, the signal $436_i$ is a modulation signal (e.g., a pulse-width-modulation signal) from time $t_4$ to time $t_7$. In yet another example, the pulse-width-modulation signal $436_i$ has a pulse width that corresponds to the dimming control as reflected by the time duration from time $t_1$ to time $t_s$.

In yet another embodiment, the signal $434_i$ generated by the system controller $480_i$ remains at the logic high level from time $t_3$ to time $t_5$, and time $t_5$ follows time $t_4$. For example, at time $t_5$, the signal $434_i$ changes from the logic high level to the logic low level. In another example, from time $t_4$ to time $t_5$, the current $432_i$ increases with time and reaches a maximum magnitude at time $t_5$, so the voltage $426_i$ reaches a corresponding maximum magnitude at time $t_5$, as shown by the waveform 640. In yet another example, at time $t_5$, all of the currents $820_i$ each reach their corresponding maximum magnitudes, so the current 460 also reaches a maximum magnitude. In yet another example, the maximum magnitude of the current 460 is high than the holding current of the TRIAC dimmer 410, so that the TRIAC dimmer 410 remains to be turned on at time $t_5$.

In yet another embodiment, from time $t_5$ and time $t_6$, the signal $434_i$ remains at the logic low level. For example, from time $t_5$ and time $t_6$, the voltage $426_i$ becomes smaller than the corresponding maximum magnitude that the voltage $426_i$ reaches at time $t_5$. In another example, at time $t_6$, the voltage $426_i$ becomes smaller than $V_B + \Delta V_2$, even though the voltage $426_i$ is still larger than $V_B$, where $V_B$ represents the threshold magnitude that is stored by the system controller $480_i$, and $\Delta V_2$ represents a predetermined threshold that is larger than zero. In yet another example, at time $t_6$, in response to the voltage $426_i$ becoming smaller than $V_B + \Delta V_2$, even though still larger than the threshold magnitude $V_B$, the signal $434_i$ generated by the system controller $480_i$ becomes a modulation signal at time $t_6$, changing between a logic high level and a logic low level, as shown by the waveform 620.

According to one embodiment, the signal $434_i$ is a modulation signal from time $t_6$ to time $t_7$. For example, from time $t_6$ to time $t_7$, the voltage $426_i$ remains larger than or approximately equal to the threshold magnitude $V_B$ by a closed-loop regulation, so that the voltage $426_i$ remains larger than the magnitude $V_A$ of the voltage $426_i$ from time $t_6$ to time $t_7$, where the magnitude $V_A$ of the voltage $426_i$ corresponds to the holding current of the TRIAC dimmer 410. In another example, from time $t_6$ to time $t_7$, the current flowing through the TRIAC dimmer 410 remains larger than the holding current of the TRIAC dimmer 410, so that the TRIAC dimmer 410 is not turned off by the insufficient current flowing through the TRIAC dimmer 410.

According to another embodiment, time $t_7$ is the end of the half cycle of the AC input voltage 414 that starts at time $t_s$, and time $t_7$ is also the beginning of another half cycle of the AC input voltage 414. For example, as shown by the waveform 610, the voltage $424_i$ becomes zero at time $t_7$ and remains to be zero until the TRIAC dimmer 410 is turned on. In another example, as shown by the waveform 620, the signal $434_i$ is at the logic high level at time $t_7$, and remains at the logic high level until sometime after the TRIAC dimmer 410 is turned on. In yet another example, as shown by the waveform 630, the signal $436_i$ is at the logic low level at time $t_7$, and remains at the logic low level until the TRIAC dimmer 410 is turned on. In yet another example, as shown by the waveform 640, the voltage $426_i$ decreases to zero soon after time $t_7$, and remains to be zero until the TRIAC dimmer 410 is turned on.

Figure 9:
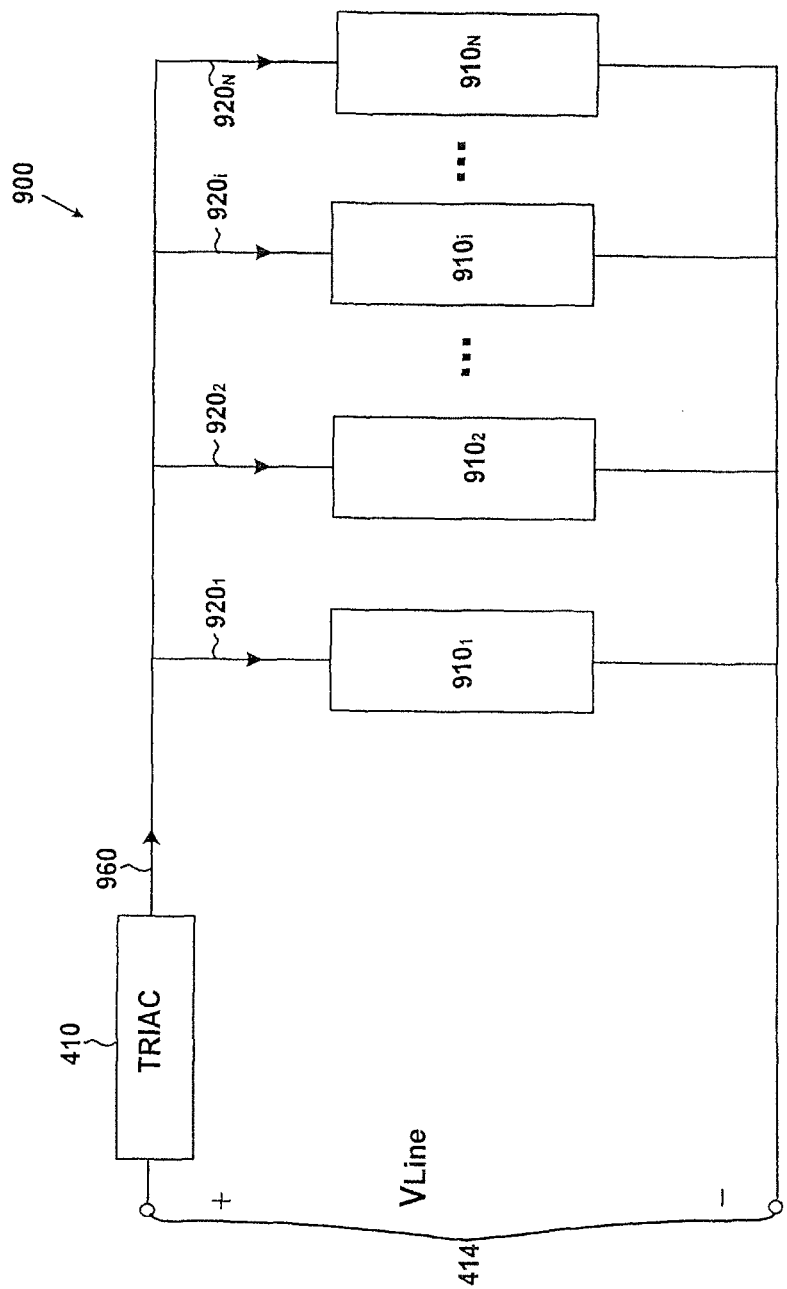
FIG. 9 is a simplified diagram of a lighting system that includes multiple lamp subsystems according to another embodiment of the present invention.

FIG. 9 is a simplified diagram of a lighting system that includes multiple lamp subsystems according to another embodiment of the present invention. This diagram is merely an example, which should not unduly limit the scope of the claims. One of ordinary skill in the art would recognize many variations, alternatives, and modifications. The lighting system 900 includes a TRIAC dimmer 410 and multiple lamp subsystems $910_1, 910_2, \ldots 910_i, \ldots$ and $910_N$, wherein N is an integer that is larger than 1, and i is an integer that is larger than or equal to 1 and is smaller than or equal to N.

In one embodiment, each of the multiple lamp subsystems includes a rectifier (e.g., a rectifier 420), a current sink (e.g., a current sink 430), an LED driver (e.g., an LED driver 440), one or more LEDs (e.g., one or more LEDs 450), resistors (e.g., resistors 470, 472, 474, 476, and 478), and a system controller (e.g., a system controller 480). For example, the system controller (e.g., the system controller 480) of each of the multiple lamp subsystems includes terminals (e.g., terminals 482, 484, 486, and 488), and processing components (e.g., processing components 492, 494, 496, and 498). In another embodiment, the lamp subsystem $910_i$ includes a rectifier $420_i$, a current sink $430_i$, an LED driver $440_i$, one or more LEDs $450_i$, resistors $470_i$, $472_i$, $474_i$, $476_i$, and $478_i$, and a system controller $480_i$. For example, the system controller $480_i$ includes terminals $482_i$, $484_i$, $486_i$, and $488_i$, and processing components $492_i$, $494_i$, $496_i$, and $498_i$. In another example, the system controller $480_i$ outputs a signal $434_i$ to the current sink $430_i$ to control the current $432_i$. In yet another example, the current $432_i$ is smaller than or equal to a current $920_i$ that flows into the lamp subsystem $910_i$. In yet another embodiment, a current 960 is equal to the current flowing through the TRIAC dimmer 410, and is also equal to the sum of a current $920_1$, a current $920_2$, ..., a current $920_i$, ... and a current $920_N$. For example, the currents $920_1$, $920_2$, ..., $920_i$, ... and $920_N$ are currents that flow into the lamp subsystems $910_1$, $910_2$, ... $910_i$, ... and $910_N$, respectively.

According to one embodiment, after the processing component $492_i$ has detected that the TRIAC dimmer 410 is included in the lighting system 900, and after the processing component $492_i$ has also determined whether the TRIAC dimmer 410 is a leading-edge TRIAC dimmer or a trailing-edge TRIAC dimmer, the processing component $498_i$ is configured to work with the processing component $494_i$ of the same lamp subsystem $910_i$ and with the processing components $498_j$ of each of the other lamp subsystems $910_j$ to detect the holding current of the TRIAC dimmer 410, and use the closed-loop control to control the current $432_i$, wherein j is an integer that is larger than or equal to 1 and is smaller than or equal to N, and j is not equal to i. For example, the multiple lamp subsystems $910_1$, $910_2$, . . . $910_i$, . . . and $910_N$ work together, and satisfy the following equation:

$$I_{holding} < \sum_{i=1}^{N} I_i < I_{holding} \times N \qquad \text{(Equation 2)}$$

wherein $I_{holding}$ represents the magnitude of the holding current of the TRIAC dimmer 410, and $I_i$ represents the magnitude of the current $920_i$. N is an integer that is larger than 1, and i is an integer that is larger than or equal to 1 and is smaller than or equal to N.

According to certain embodiments, systems and methods are provided for intelligent control related to TRIAC dimmers. For example, the systems and methods can intelligently detect the type of a TRIAC dimmer. In another example, the type of the TRIAC dimmer can be a leading-edge TRIAC dimmer, a trailing-edge TRIAC dimmer, or the situation that no TRIAC dimmer is included in the lighting system. In yet another example, the detection of the type of a TRIAC dimmer takes into account a threshold voltage as well as rate of voltage change. In yet another example, the systems and methods also provide intelligent control that matches with the detected type of the TRIAC dimmer.

According to some embodiments of the present invention, systems and methods can provide intelligent detection of the type of a TRIAC dimmer and also provide dimming control without causing one or more LEDs to flicker. For example, the systems and methods are configured to detect whether or not a TRIAC dimmer is included in the lighting system, and if the TRIAC dimmer is detected to be included in the lighting system, whether the TRIAC dimmer is a leading-edge TRIAC dimmer or a trailing-edge TRIAC dimmer. In another example, the systems and methods are further configured to detect the holding current of the TRIAC dimmer, and use the closed-loop control so that the current flowing through the TRIAC dimmer exceeds, but does not exceed too much, the holding current of the TRIAC dimmer in order to reduce flickering of the one or more LEDs and also to improve efficiency of the lighting system. In yet another example, the systems and methods are further configured to process a voltage that has waveforms not symmetric between a positive half cycle and a negative half cycle of an AC input voltage in order to provide to one or more LEDs a current that is symmetric between the positive half cycle and the negative half cycle of the AC input voltage 414. In yet another example, the systems and methods are further configured to, if the lighting system includes multiple lamp subsystems, control the current flowing through the TRIAC dimmer so that this current exceeds, but does not exceed too much, the holding current of the TRIAC dimmer in order to reduce flickering of the one or more LEDs and also to improve efficiency of the lighting system.

According to another embodiment, a system controller for a lighting system includes a first controller terminal configured to receive a first signal, and a second controller terminal configured to output a second signal to a diver component. The driver component is configured to receive a first current and provide one or more drive currents to one or more light emitting diodes in response to the second signal. Additionally, the system controller is configured to process information associated with the first signal, determine a first time period for the first signal to increase from a first threshold to a second threshold, and determine a second time period for the first signal to decrease from the second threshold to the first threshold. Moreover, the system controller is further configured to, in response to the second time period minus the first time period being larger than a predetermined positive value, determine the first signal to be associate with a leading-edge TRIAC dimmer, and in response to the first time period minus the second time period being larger than the predetermined positive value, determine the first signal to be associate with a trailing-edge TRIAC dimmer. Also, the system controller is further configured to, in response to an absolute value of the first time period minus the second time period being smaller than the predetermined positive value, determine the first signal not to be associated with any TRIAC dimmer. For example, the system controller is implemented according to at least FIG. 4, FIG. 5, FIG. 8, and/or FIG. 9.

According to another embodiment, a system controller for a lighting system includes a first controller terminal configured to receive a first signal associated with a TRIAC dimmer, and a second controller terminal configured to output a second signal to a current sink. The current sink is configured to receive a first current in response to the second signal. Additionally, the system controller includes a third controller terminal configured to output a third signal to a driver component. The driver component is configured to receive a second current and provide one or more drive currents to one or more light emitting diodes in response to the third signal. Moreover, the system controller includes a fourth controller terminal configured to receive a fourth signal. The fourth signal is related to a third current that flows through the TRIAC dimmer. Also, the system controller is configured to process information associated with the first signal, and determine the TRIAC dimmer is turned on at a first time based at least in part on the first signal. Additionally, the system controller is configured to, after the first time, with a first delay, decrease a duty cycle of the second signal from a first predetermined value until the fourth signal indicates that the TRIAC dimmer is turned off at a second time, and in response to the fourth signal indicating that the TRIAC dimmer is turned off at the second time, set a first threshold for the fourth signal, the first threshold being related to a holding current of the TRIAC dimmer. Moreover, the system controller is further configured to process information associated with the first signal, and determine the TRIAC dimmer is turned on at a third time based at least in part on the first signal. Also, the system controller is further configured to, after the third time, with a second delay, change the second signal from a first logic level to a second logic level and keep the second signal at the second logic level until a fourth time, and at the fourth time, change the second signal to a modulation signal to regulate the fourth signal at a second threshold in order to keep the fourth signal larger than the first threshold and keep the third current larger than the holding current of the TRIAC dimmer. The second threshold is larger than the first threshold, and the modulation signal changes between the first logic level and the second logic level. For example, the system controller is implemented according to at least FIG. 4, FIG. 6, FIG. 8, and/or FIG. 9.

According to yet another embodiment, a method for a lighting system includes receiving a first signal, processing information associated with the first signal, determining a first time period for the first signal to increase from a first threshold to a second threshold, determining a second time period for the first signal to decrease from the second threshold to the first threshold, and processing information associated with the first time period and the second time period. Additionally, the method includes, in response to the second time period minus the first time period being larger than a predetermined positive value, determining the first signal to be associate with a leading-edge TRIAC dimmer, and in response to the first time period minus the second time period being larger than the predetermined positive value, determining the first signal to be associate with a trailing-edge TRIAC dimmer. Moreover, the method includes, in response to an absolute value of the first time period minus the second time period being smaller than the predetermined positive value, determining the first signal not to be associated with any TRIAC dimmer. For example, the method is implemented according to at least FIG. 4, FIG. 5, FIG. 8, and/or FIG. 9.

According to yet another embodiment, a method for a lighting system includes receiving a first signal associated with a TRIAC dimmer, receiving a second signal related to a first current that flows through the TRIAC dimmer, processing information associated with the first signal, and determining the TRIAC dimmer is turned on at a first time based at least in part on the first signal. Additionally, the method includes, after the first time, with a first delay, decreasing a duty cycle of a third signal from a first predetermined value until the second signal indicates that the TRIAC dimmer is turned off at a second time, and setting a first threshold for the second signal in response to the second signal indicating that the TRIAC dimmer is turned off at the second time, the first threshold being related to a holding current of the TRIAC dimmer. Moreover, the method includes determining that the TRIAC dimmer is turned on at a third time based at least in part on the first signal, and after the third time, with a second delay, changing the third signal from a first logic level to a second logic level and keep the third signal at the second logic level until a fourth time. Also, the method includes at the fourth time, changing the third signal to a modulation signal to regulate the second signal at a second threshold in order to keep the second signal larger than the first threshold and keep the first current larger than the holding current of the TRIAC dimmer. The second threshold is larger than the first threshold, and the modulation signal changes between the first logic level and the second logic level. For example, the method is implemented according to at least FIG. 4, FIG. 6, FIG. 8, and/or FIG. 9.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a lighting system, the system controller comprising:
   a first controller terminal configured to receive a first signal; and
   a second controller terminal configured to output a second signal to a driver component, the driver component being configured to receive a first current and provide one or more drive currents to one or more light emitting diodes in response to the second signal;
   wherein the system controller is configured to:
      process information associated with the first signal;
      determine a first time period for the first signal to increase from a first threshold to a second threshold; and
      determine a second time period for the first signal to decrease from the second threshold to the first threshold;
   wherein the system controller is further configured to:
      in response to the second time period minus the first time period being larger than a predetermined positive value, determine the first signal to be associate with a leading-edge TRIAC dimmer;
      in response to the first time period minus the second time period being larger than the predetermined positive value, determine the first signal to be associate with the trailing-edge TRIAC dimmer; and
      in response to an absolute value of the first time period minus the second time period being smaller than the predetermined positive value, determine the first signal not to be associated with any TRIAC dimmer.

2. A method for a lighting system, the method comprising:
   receiving a first signal;
   processing information associated with the first signal;
   determining a first time period for the first signal to increase from a first threshold to a second threshold;
   determining a second time period for the first signal to decrease from the second threshold to the first threshold;
   processing information associated with the first time period and the second time period;
   in response to the second time period minus the first time period being larger than a predetermined positive value, determining the first signal to be associate with a leading-edge TRIAC dimmer;
   in response to the first time period minus the second time period being larger than the predetermined positive value, determining the first signal to be associate with a trailing-edge TRIAC dimmer; and
   in response to an absolute value of the first time period minus the second time period being smaller than the predetermined positive value, determining the first signal not to be associated with any TRIAC dimmer.

3. The method of claim 2 wherein the fourth signal represents the third current that flows through the leading-edge TRIAC dimmer or the trailing-edge TRIAC dimmer.

4. The method of claim 2 wherein the fourth signal represents one component of multiple components of the third current that flows through the leading-edge TRIAC dimmer or the trailing-edge TRIAC dimmer.

* * * * *